(12) United States Patent
Yoshida et al.

(10) Patent No.: US 8,601,239 B2
(45) Date of Patent: Dec. 3, 2013

(54) EXTENDED REGISTER ADDRESSING USING PREFIX INSTRUCTION

(75) Inventors: Toshio Yoshida, Kawasaki (JP);
Yasunobu Akizuki, Kawasaki (JP);
Ryuichi Sunayama, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 630 days.

(21) Appl. No.: 12/827,238

(22) Filed: Jun. 30, 2010

(65) Prior Publication Data
US 2010/0332803 A1 Dec. 30, 2010

(30) Foreign Application Priority Data

Jun. 30, 2009 (JP) .................. 2009-156374

(51) Int. Cl.
*G06F 9/30* (2006.01)
(52) U.S. Cl.
USPC ........................................................ 712/213
(58) Field of Classification Search
USPC ........................................................ 712/213
See application file for complete search history.

(56) References Cited

U.S. PATENT DOCUMENTS

| | | | |
|---|---|---|---|
| 6,167,505 A * | 12/2000 | Kubota et al. ............. | 712/210 |
| 6,763,449 B1 | 7/2004 | Sugano et al. | |
| 7,269,716 B2 * | 9/2007 | Yoshida ..................... | 712/216 |
| 7,340,589 B2 * | 3/2008 | Kudo .......................... | 712/213 |
| 8,281,112 B2 * | 10/2012 | Yoshida et al. ............. | 712/226 |
| 2006/0101240 A1 | 5/2006 | Arai | |

FOREIGN PATENT DOCUMENTS

| | | | |
|---|---|---|---|
| EP | 0489266 A2 * | 6/1992 | ............... G06F 9/30 |
| JP | 2000-284962 | 10/2000 | |
| JP | 2001-296999 | 10/2001 | |
| JP | 2006-92158 | 4/2006 | |
| JP | 2006-313561 | 11/2006 | |
| JP | 2008-299790 | 12/2008 | |

OTHER PUBLICATIONS

Office Action issued by the Japanese Patent Office on Aug. 20, 2013 in the corresponding Japanese patent application No. 2009-156374, pp. 1-7.

* cited by examiner

*Primary Examiner* — Andrew Caldwell
*Assistant Examiner* — Yuqing Xiao
(74) *Attorney, Agent, or Firm* — Staas & Halsey LLP

(57) ABSTRACT

A processor includes a storage unit storing an instruction, an instruction extension information register that includes a first area and a second area, an instruction decoding unit that decodes a first prefix instruction including first extension information extending an immediately following instruction written to the first area when the first prefix instruction is executed, and that decodes a second prefix instruction including the first extension information and a second extension information extending an instruction immediately following two instructions of the second prefix instruction, an instruction packing unit that generates a packed instruction including at least one of the first prefix instruction or the second prefix instruction, and the instruction immediately following the first prefix instruction or the second prefix instruction when the instruction decoding unit decodes the first prefix instruction or the second prefix instruction, an instruction execution unit that executes the packed instruction generated by the instruction packing unit.

14 Claims, 26 Drawing Sheets

OPCODE[4:0]=5'b000111

FIG.10

| 31 30 29 | 25 24 | 19 18 | 14 13 | 9 8 | 6 5 | 4 0 |
|---|---|---|---|---|---|---|
| 10 | RD | 11011 | RS1 | RS3 | var | size | RS2 |

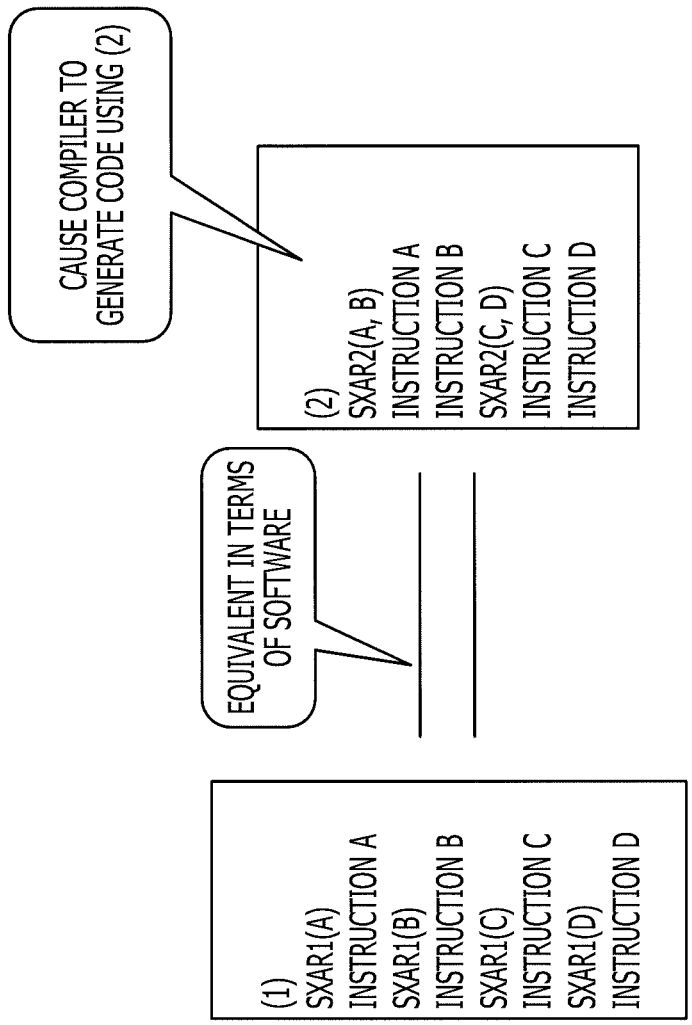

EXTENDED REGISTER ADDRESSING USING PREFIX INSTRUCTION

CROSS-REFERENCE TO RELATED APPLICATIONS

This application is based upon and claims priority to prior Japanese Patent Application No. 2009-156374 filed on Jun. 30, 2009 in the Japan Patent Office, the entire contents of which are incorporated herein by reference.

FIELD

Various embodiments described herein relate to a processor and a control method for processor.

BACKGROUND

Hitherto, in processors such as central processing units (CPUs), a technology in which an instruction is extended by making an instruction length a variable length has been typically used. Processors have an execution queue having a plurality of entries for storing instruction information and the like used to execute an instruction, and an entry of an execution queue is assigned to each instruction.

When the number of instructions to be stored in an execution queue is to be increased, it is desired to connect circuits in series for selecting an instruction from a plurality of entries possessed by the execution queue. Then, it is desired to connect selection circuits that select an instruction from a plurality of entries of the execution queue at many execution pipeline stages. When selection circuits are connected at many stages in this manner, the selection by the selection circuits of many stages may not be completed within a period of one clock cycle of the operating frequency of the processor. That is, this causes the operating frequency of the entire processor to decrease. In other words, leads to a decrease in the processing performance of the processor.

In contrast, in a technique in which the above mentioned variable length instruction is used, the total size of instructions in the entire program increases, but the number of instructions in the entire program does not increase. That is, it is not necessary to increase the number of instructions that can be stored in the execution queue, and the number of entries in the execution queue does not increase. That is, the amount of information per instruction stored within the entry in the execution queue increases, but the number of entries to be selected does not increase. Therefore, although in the circuit that selects an instruction from the execution queue, an increase is made in the parallel direction (bit width direction) such as the width of bits to be selected, the number of steps to be carried out in the selection circuit that performs selection is not changed. Thus, no increase is made in the series direction (series of gate stages direction or series of pipeline stages direction). Therefore, a large influence is not exerted on the operating frequency of the processor. Furthermore, in the above described technique of using a variable instruction length, after an instruction decoder decodes an instruction opcode, since the instruction opcode is not used, it is not necessary to store the instruction opcode itself.

[Patent Document 1] Japanese laid-open Patent Publication No. 2000-284962

[Patent Document 2] Japanese laid-open Patent Publication No. 2006-92158

[Patent Document 3] Japanese laid-open Patent Publication No. 2001-296999

SUMMARY

According to an embodiment, a processor includes a storage unit storing an instruction, an instruction extension information register that includes a first area and a second area, an instruction decoding unit that decodes a first prefix instruction including first extension information extending an immediately following instruction written to the first area when the first prefix instruction is executed, and that decodes a second prefix instruction including the first extension information and a second extension information extending an instruction after two instructions written to the second area respectively, an instruction packing unit that generates a packed instruction including at least one of the first prefix instruction or the second prefix instruction, and the instruction immediately following the first prefix instruction or the second prefix instruction when the instruction decoding unit decodes the first prefix instruction or the second prefix instruction, an instruction execution unit that executes the packed instruction generated by the instruction packing unit.

BRIEF DESCRIPTION OF THE DRAWINGS

FIG. 10 illustrates an example of an FMA instruction format of SPARC JPS1;

FIG. 26 illustrates the relationship between an SXAR1 instruction and an SXAR2 instruction.

DESCRIPTION OF EMBODIMENTS

Embodiments of an arithmetic processing apparatus and a control method will be described below in detail with reference to the drawings. The present invention is not limited to these embodiments.

An arithmetic processing apparatus to be disclosed is a CPU, for example. In particular, in an instruction set architecture in which the instruction length is a fixed length, extension of an instruction is made possible. Furthermore, it is possible for the disclosed arithmetic processing apparatus to efficiently use hardware resources (register areas, for example) used to execute an instruction and an extension instruction. Accordingly, in a first embodiment, the configuration of an arithmetic processing apparatus to be disclosed will be described. Here, there are two types of prefix instructions to be disclosed, with a first prefix instruction being denoted as "SXAR1" (Set eXtended Arithmetic Register 1) and a second prefix instruction being denoted as "SXAR2" (Set eXtended Arithmetic Register 2). When there is no particular need to distinguish between these instructions, these will be simply described as "SXAR".

Figure 1:
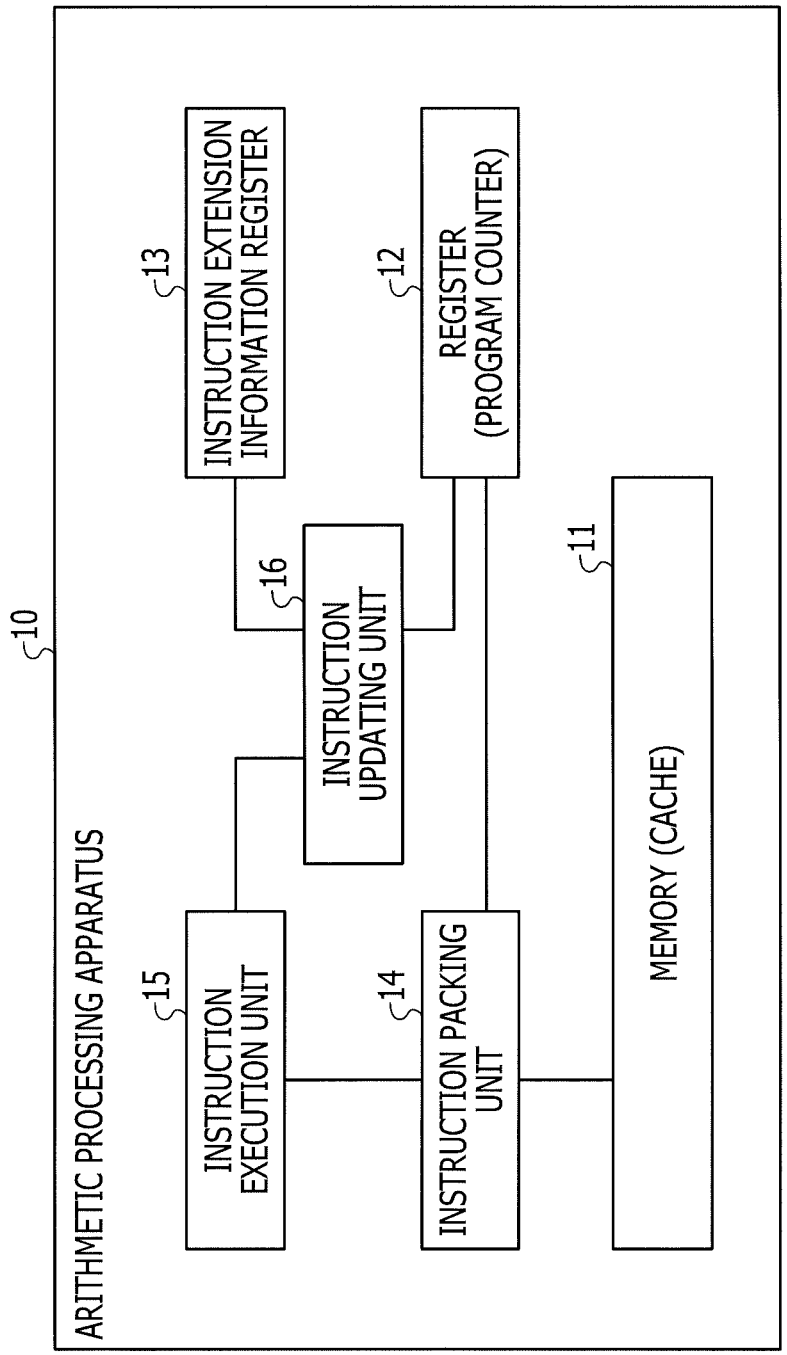
FIG. 1 is a block diagram illustrating the configuration of an arithmetic processing apparatus according to a first embodiment.
Figure 2:
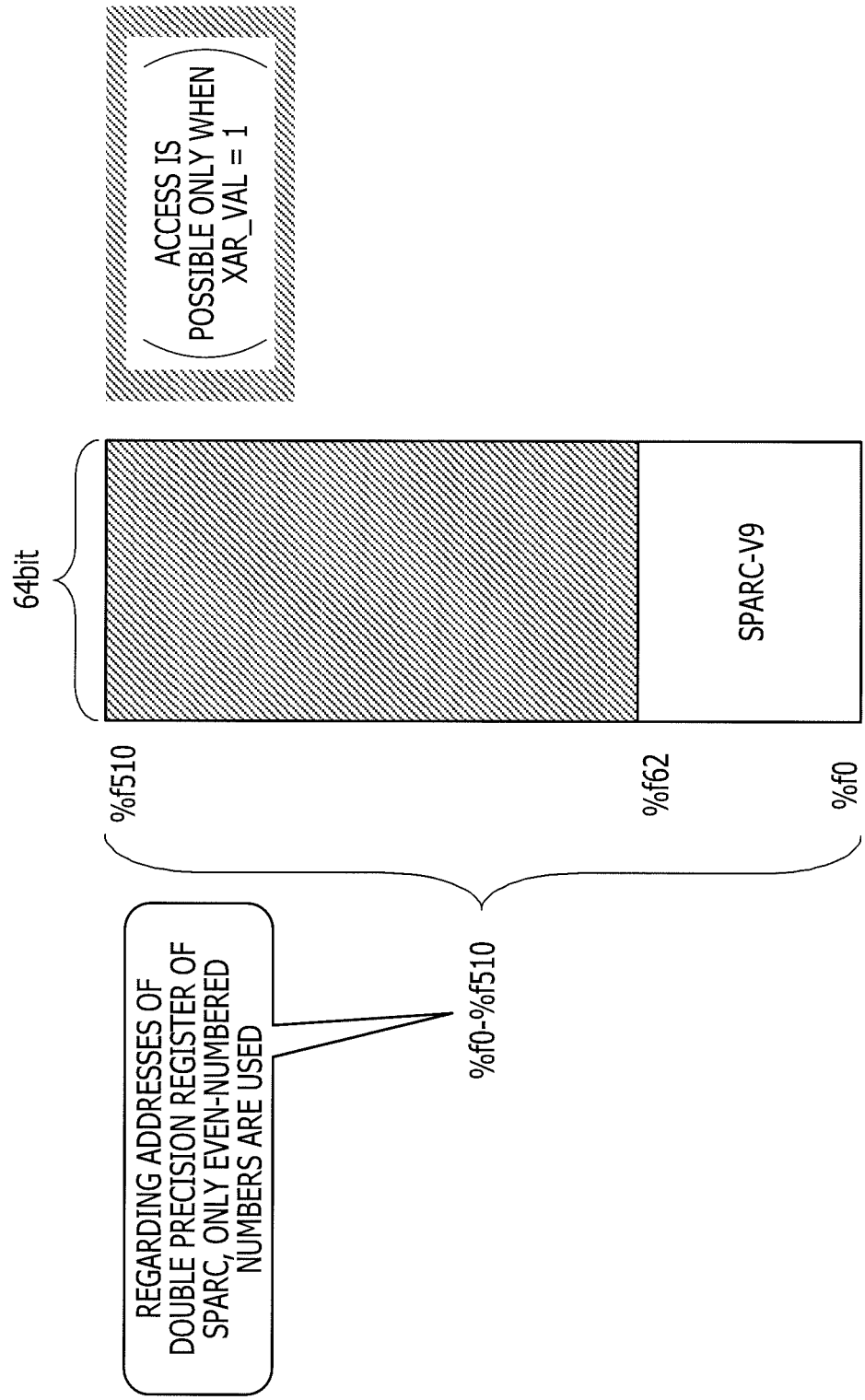
FIG. 2 illustrates an example of a floating-point register.

FIG. 1 is a block diagram illustrating the configuration of an arithmetic processing apparatus according to the first embodiment. As illustrated in FIG. 1, an arithmetic processing apparatus 10 includes a memory 11, a register 12, an instruction extension information register 13, an instruction packing unit 14, an instruction execution unit 15, and a register updating unit 16. Here, the arithmetic processing apparatus 10 according to the first embodiment has RISC (Reduced Instruction Sec Computer) architecture, such as SPARC (Scalable Processor ARchitecture), and is a CPU employing fixed-length instructions. Furthermore, as illustrated in FIG. 2, the arithmetic processing apparatus 10 has, for example, 256 floating-point registers of a 64-bit width. FIG. 2 depicts an example of a floating-point register.

The memory 11 is a main storage device (main memory) for storing data and programs, and is a semiconductor storage device, such as a RAM (Random Access Memory) or a ROM (Read Only Member) from and to which reading and writing can be directly performed by an arithmetic processing apparatus such as a CPU, for example. Here, although the main storage device has been described by using a main storage device as an example, the main storage device is not limited to this. For example, the main storage device may be a cache memory, such as a primary cache or a secondary cache. Examples of the register 12 include a PC (Program Counter) that indicates an instruction address in the memory 11 in which an instruction to be executed next is stored, a fixed-point register, and a floating-point register.

Figure 3:
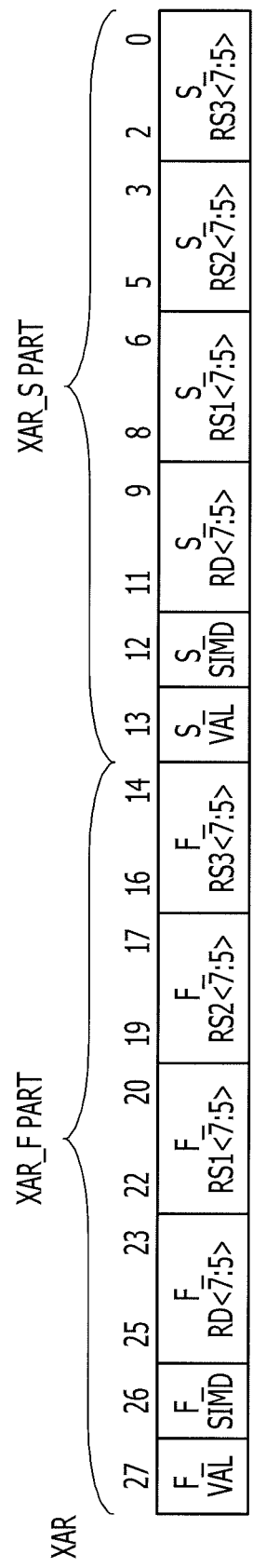
FIG. 3 illustrates an example of an instruction extension information register 13.

The instruction extension information register 13 is an XAR register (eXtended Arithmetic Register) for storing a plurality of items of instruction extension information. For example, as illustrated in FIG. 3, the instruction extension information register 13 is a register of a 28-bit width for storing instruction extension information for two instructions having XAR_F that is an extension information field for the first instruction, and XAR_S that is an extension information field for the second instruction. The extension information field possessed by the instruction extension information register 13 has, at the 27th bit, an "F_VAL" field indicating whether the extension information (data) XAR_F part of the first instruction is valid or invalid. Furthermore, the extension information field possessed by the instruction extension information register 13 has, at the 26th bit, an "F_SIMD" field that specifies operation by SIMD (Single Instruction Multiple Data. For example, when the value of the "F_SIMD" field is 1, SIMD operation is performed. The extension information field has an extension portion of register specification in which three source operands to be arithmetically operated by a FMA (Fused Multiply Add) instruction, and a destination (arithmetic operation result) of an FMA instruction are stored. More specifically, the extension information field has an "F_RD <7:5>" field at the 25th to 23rd bits for specifying a destination register for storing the arithmetic operation result of the FMA arithmetic operation, an "F_RS1 <7:5>" field at the 22 to 20th bits for specifying a source-1 register, an "F_RS2 <7:5>" field at the 19th to 17th bits for specifying a source-2 register, and an "F_RS3 <7:5>" field at the 16th to 14th bits for specifying a source-3 register. Furthermore, the extension information field possessed by the instruction extension information register 13 has an "S_VAL" field at the 13th bit, and the "S_VAL" field indicating whether or not the extension information (data) XAR_S part of the second instruction is valid, and has, at the 12th bit, an "S_SIMD" field that specifies operation using SIMD. Furthermore, the extension information field has an extension portion of register specification for storing three source operands on which an arithmetic operation is to be performed with an FMA instruction, and a destination (arithmetic operation result) of an FMA instruction. More specifically, the extension information field has an "S_RD <7:5>" field at the 11th to 9th bits, which specifies a destination register for storing the arithmetic operation result of the FMA arithmetic operation, an "S_RS1 <7:5>" field at the 8th to 6th bits, which specifies a source-1 register, an "S_RS2 <7:5>" field at the 5th to 3rd bits, which specifies a source-2 register, and an "S_RS3 <7:5>" field at the 2nd to 0th bits, which specifies a source-3 register. The XAR_F part and the XAR_S part are reset as a consequence of the commitment (the completion of the instruction execution) of each of the extension instructions. FIG. 3 illustrates an example of the instruction extension information register 13. SIMD refers to a method in which a plurality of arithmetic operations on a plurality of data are processed by one instruction and, for example, an MMX (MultiMedia eXtension) instruction of Intel Corporation is known. An FMA instruction is a product-sum arithmetic operation instruction of performing an arithmetic operation of a×b+c on three operands a, b, and c, for example. The detailed instruction format of an FMA instruction in the embodiment will be described later.

The instruction packing unit 14 couples (packs) a prefix instruction and an instruction that is decoded immediately following the prefix instruction in a case where the instruction read from the memory 11 having the instruction stored therein is a prefix instruction that writes instruction extension information into the instruction extension information register 13. More specifically, at first, an instruction identified by the address specified by the register (program counter) 12 is read from the memory 11. Then, the instruction packing unit 14 writes instruction extension information to the instruction extension information register 13 when the read instruction is a prefix instruction (SXAR instruction), packs the prefix instruction and the instruction that is decoded immediately following the prefix instruction, and outputs the packed instructions to an instruction execution unit 15 (to be described later).

Figure 4:
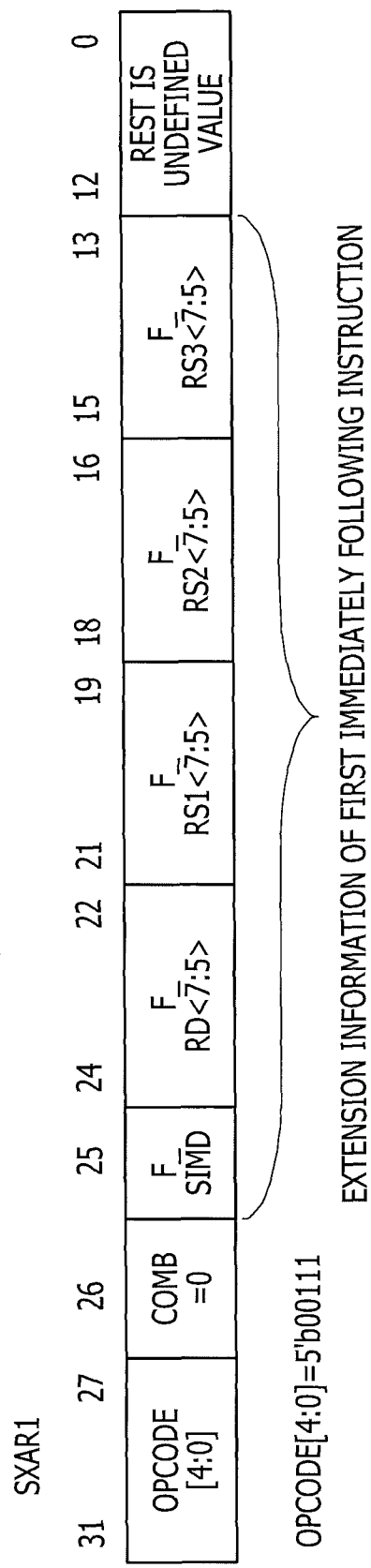
FIG. 4 illustrates an example of a prefix instruction SXAR1.

Here, the prefix instruction (SXAR instruction) will be described. The prefix instruction SXAR is an instruction that updates an XAR. Because the XAR is able to hold information on up to two instructions, a prefix instruction SXAR1 capable of specifying one instruction, and a prefix instruction SXAR2 capable of specifying two instructions are correspondingly available. As illustrated in FIG. 4, the prefix instruction SXAR1 has a 32-bit instruction length, which is the same as that of the other instructions, and has a field having extension information for one instruction, and a blank field.

More specifically, 31st to 27th bits are an "OPCODE [5:0]" field indicating the opcode of a 5-bit width, which is used to decode an SXAR instruction. In the case of the SXAR instruction, OPCODE [5:0]=5'b00111 is specified. The 26th bit is a "COMB" field that distinguishes between an SXAR1 instruction and an SXAR2 instruction, and in the case of an SXAR1 instruction, COMB=1'b0 is specified. The 25th bit is an "F_SIMD" field that specifies SIMD operation of the instruction immediately following the SXAR1 instruction. The 24th to 22nd bits are an "F_RD <7:5>" field that specifies a destination register for storing the arithmetic operation result of the instruction immediately following the SXAR1 instruction. The 21st to 19th bits are an "F_RS1 <7:5>" field that specifies an operand register 1 for storing a source operand 1 on which an arithmetic operation of an instruction immediately following the SXAR1 instruction is to be performed. The 18th to 16th bits are an "F_RS2 <7:5>" field that specifies an operand register 2 for storing a source operand 2 on which an arithmetic operation of an instruction immediately following the SXAR1 instruction is to be performed. The 15th to 13th bits are an "F_RS3 <7:5>" field that specifies an operand register 3 for storing a source operand 3, when a 3-operand instruction FMA is to be arithmetically operated on an instruction immediately following the SXAR1 instruction, for example. The 12th to 0th bits are a field from which an indefinite value (don't care value) is read.

Figure 5:
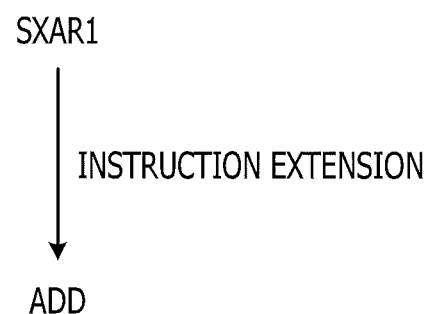
FIG. 5 illustrates instruction extension using an SXAR1 instruction.

As illustrated in FIG. 5, it is possible for the prefix instruction SXAR1 to execute one extension instruction using two fixed-length instructions, when combined with a subsequent one instruction. More specifically, when the SXAR1 instruction is executed, for an ADD instruction that is a subsequent addition instruction of a fixed-decimal point, addition is performed by using extension information (extension bits) of an F_SIMD field, which is stored in the instruction extension information register 13 by the SXAR1 instruction or the like. For example, in the case of F_SIMD=1'b1, the immediately following ADD instruction is executed as an ADD instruction of SIMD.

Figure 6:
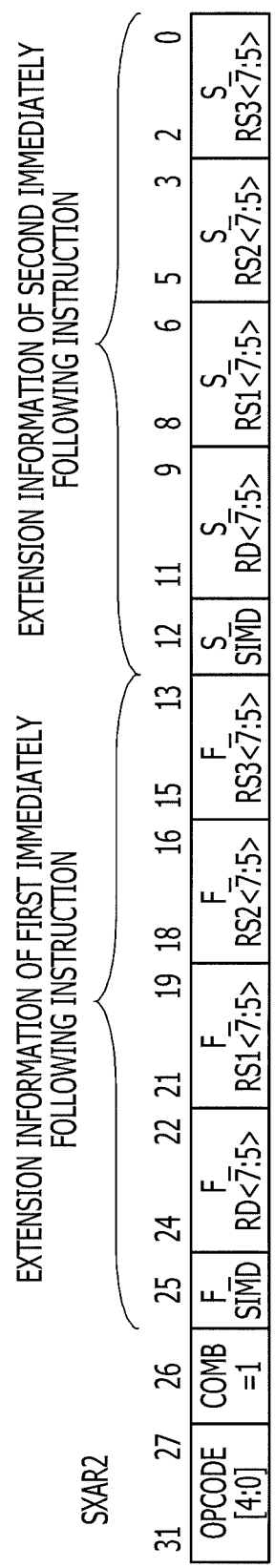
FIG. 6 illustrates an example of a prefix instruction SXAR2.

Furthermore, the prefix instruction SXAR2 has a 32-bit instruction length similarly to the SXAR1 instruction, and has a field having extension information for two instructions as illustrated in FIG. 6. More specifically, the 31st to 27th bits are an "OPCODE [5:0]" field indicating an opcode of a 5-bit width which is used to decode the SXAR instruction, and in the case of the SXAR instruction, OPCODE [5:0]=5'b00111 is specified. The 26th bit is a "COMB" field that separates between the SXAR1 instruction and the SXAR2 instruction, and in the case of the SXAR2 instruction, COMB=1'b1 is specified. The 25th bit is an "F_SIMD" field that specifies SIMD operation of the instruction immediately following the SXAR2 instruction. The 24th to 22nd bits are an "F_RD <7:5>" field that specifies a destination register for storing the arithmetic operation result of the instruction immediately following the SXAR2 instruction. The 21st to 19th bits are an "F_RS1 <7:5>" field that specifies an operand register 1 for storing the source operand 1 on which an arithmetic operation of the instruction immediately following the SXAR2 instruction is to be executed. The 18th to 16th bits are an "F_RS2 <7:5>" field that specifies an operand register 2 for storing a source operand 2 on which an arithmetic operation of the instruction immediately following the SXAR2 instruction is to be executed. The 15th to 13th bits are an "F_RS3 <7:5>" field that specifies an operand register 3 for storing a source operand 3 when a 3-operand instruction FMA is to be executed on the instruction immediately following the SXAR2 instruction.

The 12th bit is an "S_SIMD" field that specifies SIMD operation of an instruction after two instructions of the SXAR2 instruction. The 11th to 9th bits are an "S_RD <7:5>" field that specifies a destination register for storing the arithmetic operation result of the instruction after two instructions of the SXAR2 instruction. The 8th to 6th bits are an "S_RS1 <7:5>" field that specifies an operand register 1 for storing the source operand 1 on which an arithmetic operation of the instruction after two instructions of the SXAR2 instruction is to be executed. The 5th to 3rd bits are an "S_RS2 <7:5>" field that specifies the operand register 2 for storing the source operand 2 on which an arithmetic operation of the instruction after two instructions of the SXAR2 instruction is to be executed. The 2nd to 0th bits are an "S_RS3 <7:5>" field that specifies an operand register 3 for storing a source operand 3 when a 3-operand instruction FMA is to be arithmetically operated on the instruction after two instructions of the SXAR2 instruction, for example.

Figure 7:
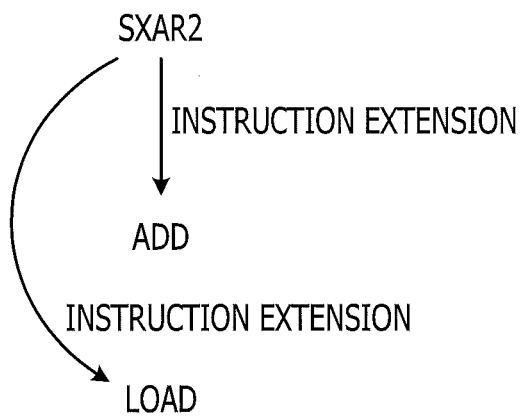
FIG. 7 illustrates instruction extension using an SXAR2 instruction.

This SXAR2 instruction is able to execute two extension instructions, when combined with an instruction immediately following the SXAR2 instruction and an instruction after two instructions, that is, two extension instructions using three instructions of a fixed length as illustrated in FIG. 7. More specifically, for the ADD instruction that is an addition instruction of a fixed-decimal point immediately following the SXAR2 instruction, addition is performed using extension information (extension bits) of the F_SIMD field or the like, which is stored in the instruction extension information register 13 by the SXAR2 instruction, when the SXAR2 instruction is executed. Then, for a LOAD instruction that is a loading instruction of a fixed-decimal point after two instructions of the SXAR2 instruction, loading is performed using extension information (extension bits) of an S_SIMD field which is stored in the instruction extension information register 13 by the SXAR2 instruction. That is, the LOAD instruction after two instructions is executed as a LOAD instruction of SIMD in the case of S_SIMD=1'b1.

Based on the foregoing, the instruction extension information specified by the prefix instruction (SXAR instruction) is stored in the XAR_F part and the XAR_S part of the instruction extension information register 13, the immediately following instruction is extended by the information of XAR_F, and the information of the XAR_S makes it possible to extend the second immediately following instruction. As a result of being defined in this manner, even if an interrupt enters between the prefix instruction (SXAR instruction) and the immediately following instruction of the prefix instruction, the extension of the instruction is made possible by using the information inside the XAR register 13.

Figure 8:
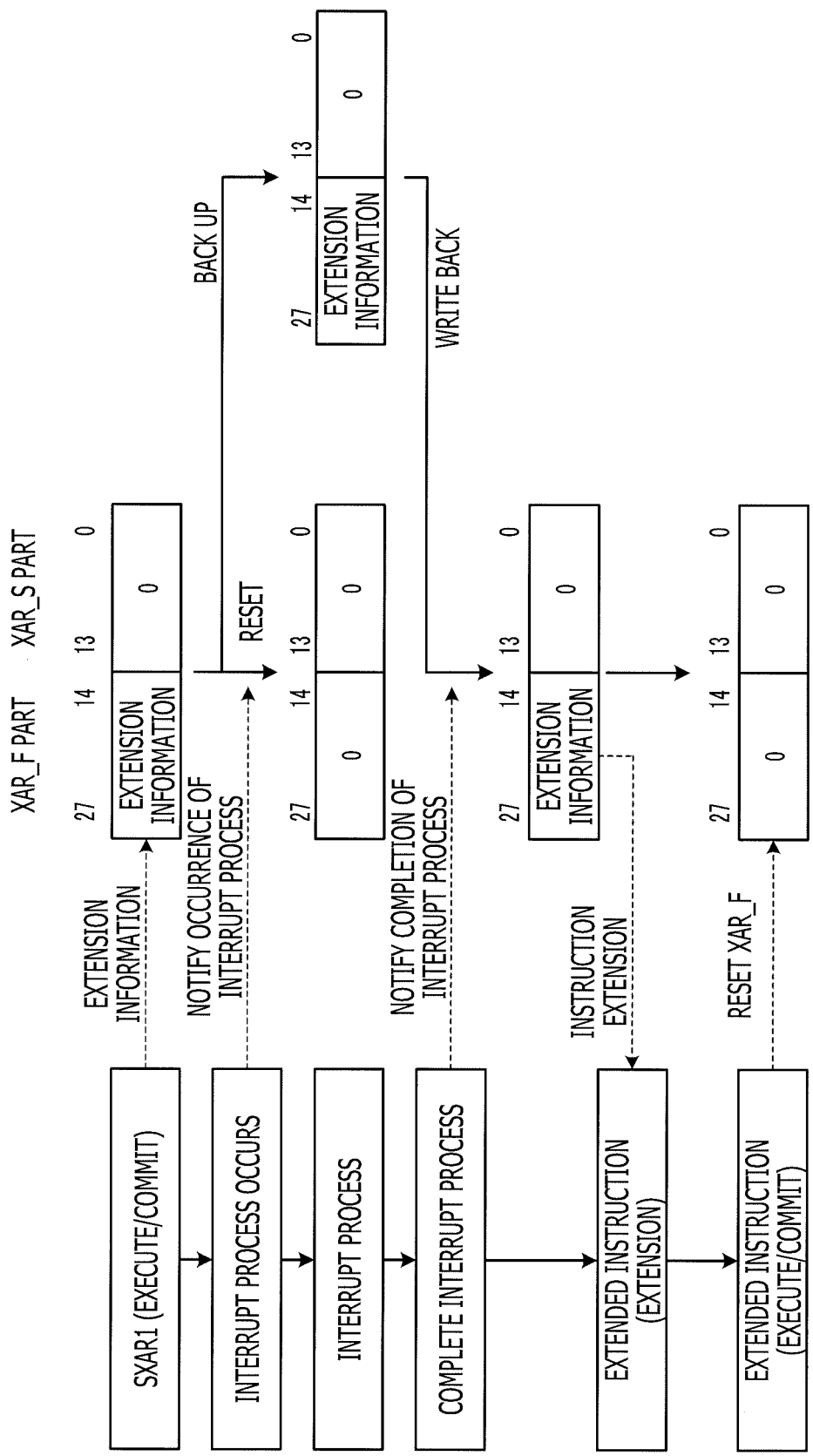
FIG. 8 illustrates an example in which an extended instruction using an SXAR1 instruction is executed after an interrupt occurs.

For example, as illustrated in FIG. 8, when the arithmetic processing apparatus 10 executes and commits the prefix instruction SXAR1, the arithmetic processing apparatus 10 stores the extension information in the XAR_F part of the instruction extension information register 13, as illustrated in FIG. 8. After the completion of the execution of the SXAR1 instruction, when an interrupt process occurs before the extended instruction immediately following the prefix instruction SXAR1 is performed, the arithmetic processing apparatus 10 temporarily stores the information of the instruction extension information register 13 in a backup register for the interrupt time, and at the same time resets the instruction extension information register 13. This backup register does not exert an influence, such as instruction extension, on the subsequent execution of an instruction. Thereafter, the information stored in the backup register for the interrupt time is written back to the instruction extension information register 13, when the interrupt process is completed and the process returns to the previous process. Therefore, in the arithmetic processing apparatus 10, the extension information of the prefix instruction SXAR1 can be referred to from the extension information of the XAR_F part of the instruction extension information register 13, after the interrupt process is completed and the process returns. Therefore, it is possible to correctly extend the extended instruction immediately following the prefix instruction SXAR1. Then, the arithmetic processing apparatus 10 resets the XAR_F part of the instruction extension information register 13, when the arithmetic processing apparatus 10 commits the execution of the extended instruction. FIG. 8 illustrates an example in which an extended instruction by the SXAR1 instruction is executed after an interrupt occurs.

Figure 9:
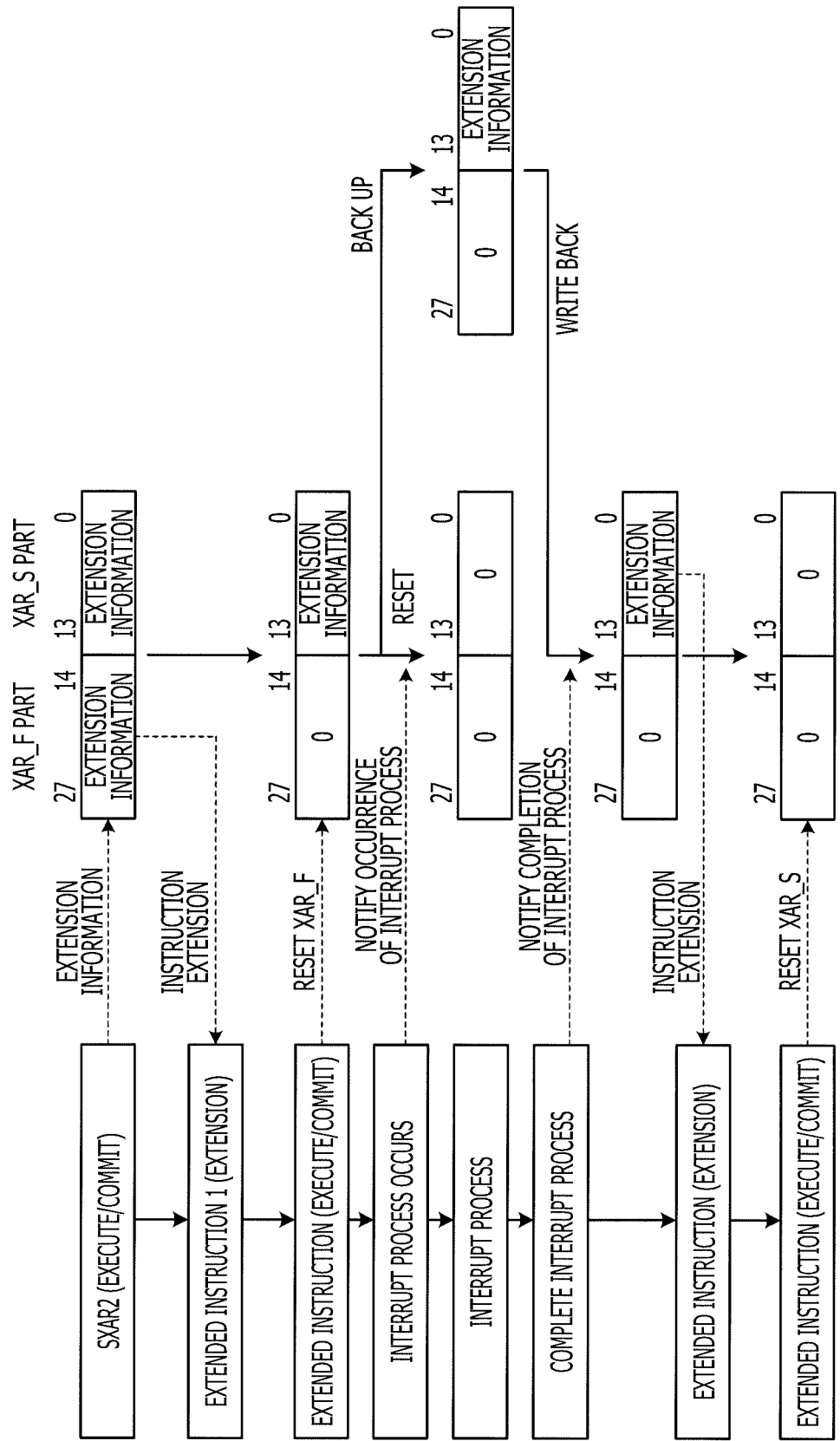
FIG. 9 illustrates an example in which an extended instruction using an SXAR2 instruction is executed after an interrupt occurs.

Furthermore, when the arithmetic processing apparatus 10 executes and commits the prefix instruction SXAR2, the arithmetic processing apparatus 10 stores the extension information in the XAR_F part and the XAR_S part of the instruction extension information register 13 as illustrated in FIG. 9, for example. After that, the arithmetic processing apparatus 10 executes an extension instruction 1 that is extended by using the extension information of the XAR_F part of the instruction extension information register 13, when the arithmetic processing apparatus 10 executes an extended instruction immediately following the prefix instruction SXAR2. Then, the arithmetic processing apparatus 10 resets the XAR_F part of the instruction extension information register 13, when the arithmetic processing apparatus 10 commits the execution of the extended instruction 1. After that, the arithmetic processing apparatus 10 temporarily stores the information of the instruction extension information register 13 in a backup register for the interrupt time, and at the same time resets the instruction extension information register 13, when an interrupt process occurs before an extended instruction after two instructions of the prefix instruction SXAR2 is executed. This backup register does not exert an influence such as instruction extension, on the execution of a subsequent instruction. After that, the information stored in the backup register for the interrupt time is written back to the instruction extension information register 13, when the interrupt process is completed and the process returns to the previous process. Therefore, it is possible for the arithmetic processing apparatus 10 to make a reference to the extension information of the prefix instruction SXAR2 based on the extension information of the XAR_S part of the instruction extension information register 13, after the interrupt process is completed and the process returns. Consequently, it is possible for the arithmetic processing apparatus 10 to correctly extend the extended instruction 2 after two instructions of the prefix instruction SXAR2. Then, the arithmetic processing apparatus 10 resets the XAR_S part of the instruction extension information register 13, when the arithmetic processing apparatus 10 commits the execution of the extended instruction 2. FIG. 9 illustrates an example in which an extended instruction is executed by using the SXAR2 instruction after an interrupt occurs. When the process returns from the interrupt process, in the case that the valid of XAR_F is 1, the extension of the instruction is performed by using the extension information of the XAR_F part, and in the case that the F_VAL field that is the valid of the XAR_F is 0 and the S_VAL field that is the valid of the XAR_S is 1, the extension of the instruction is performed using the extension information of the XAR_S part. When both the F_VAL and S_VAL fields that are valids of XAR_F and XAR_S are 0, the extension of the instruction is not performed.

Then, the instruction packing unit 14 packs the read prefix instruction and an instruction to be decoded immediately following the read prefix instruction so as to form the instructions into one instruction, and outputs it to the instruction execution unit 15, when the read instruction is the above-mentioned prefix instruction (SXAR instruction). When the read instruction is an ordinary instruction that is not the above-mentioned prefix instruction, the instruction packing unit 14 does not pack the instructions, and outputs the read instruction to the instruction execution unit 15.

More specifically, the instruction packing unit 14 generates a packed and extended instruction that is an instruction of a 45-bit width by using the 13th to 25th bits of the SXAR1 instruction and the 32 bits of the instruction that is decoded immediately following the SXAR1 instruction by packing the SXAR1 instruction and the immediately following instruction into one instruction. A description will be given as an example a case in which an instruction to be decoded immediately following the SXAR1 instruction is an FMA instruction of JPS1 (SPARC Joint Programming Specification 1) illustrated in FIG. 10. In this case, the instruction packing unit 14 generates a packed and extended instruction of a 45-bit width by using the 13th to 25th bits of the SXAR1 instruction illustrated in FIG. 4, and the instruction of a 32-bit width illustrated in FIG. 10. That is, the instruction packing unit 14 generates a packed and extended instruction of a 45-bit width by using each field of "F_RS3 <7:5>", "F_RS2 <7:5>", "F_RS1 <7:5>", "F_RD <7:5>", "F_SIMD", and an instruction of a 32-bit width. Furthermore, the instruction packing unit 14 attaches a "pack bit" of a 1-bit width information to the generated packed and extended instruction of a 45-bit width, and the "pack bit" indicating that the instruction is a packed instruction in which the SXAR1 instruction and the immediately following instruction to the SXAR1 instruction are packed as one instruction. When it is assumed that the pack bit indicates a packed instruction when the pack bit is 1, for example, the value of the pack bit to be attached to the generated packed and extended instruction of a 45-bit width is 1.

The instruction format illustrated in FIG. 10 illustrates an example of an FMA instruction format in SPARC JPS1, and the 31st and 30th bits and the 24th to 19th bits indicate opcodes used to decode an instruction. This opcode has a fixed value corresponding to the type of instruction. In this example, 10 is stored in the 31st and 30th bits, and 11011 is stored in the 24th to 19th bits. The 29th to 25th bits are an "RD" field of a 5-bit width, which specifies a destination register for storing the arithmetic operation result of the instruction. The 18th to 14th bits are an "RS1" field of a 5-bit width, which specifies an operand register 1 for storing a source operand 1 on which an instruction is to be arithmetically operated. The 13th to 9th bits are an "RS3" field of a 5-bit width, which specifies an operand register 3 for storing a source operand 3 when a 3-operand instruction FMA is to be arithmetically operated on an instruction. The 4th to 0th bits are an "RS2" field of a 5-bit width, which specifies an operand register 2 for storing a source operand 2 on which an arithmetic operation is to be executed. Furthermore, "var" of a 2-bit width information at the 8th and 7th bits and "size" of a 2-bit width information at the 6th and 5th bits are fields, which specify an arithmetic operation method in which each of the above-mentioned fields "RS1", "RS2", and "RS3" is used, and 16 types of arithmetic operation methods can be specified using a field of a total of 4 bits. However, eight types of arithmetic operation methods are specified in the SPARC JPS1 specification. For example, in the case of "var=00, size=01", an arithmetic operation of RD=RS1×RS2+RS3 is performed, and in the case of "var=10, size=01", an arithmetic operation of RD=−(RS1×RS2−RS3) is performed.

In a similar manner, a description will be given of an example of packing using an SXAR2 instruction by using SPARC JPS1 illustrated in FIG. 10. The instruction packing unit 14 packs the SXAR2 instruction and the immediately following instruction so as to form the instructions into one instruction, and generates a packed and extended instruction of a 45-bit width by using the 13th to 25th bits of the SXAR2 instruction and the 32 bits of the instruction to be decoded immediately following the SXAR2 instruction. For example, the instruction packing unit 14 generates a packed and extended instruction of a 45-bit width by using each field of "F_RS3 <7:5>", "F_RS2 <7:5>", "F_RS1 <7:5>", "F_RD <7:5>", "F_SIMD" illustrated in FIG. 4, and the instruction of a 32-bit width illustrated in FIG. 10. Furthermore, the instruction packing unit 14 attaches a "pack bit" of a 1-bit width to the generated instruction of a 45-bit width, and the "pack bit" indicates that the instruction is a packed and extended instruction in which the SXAR instruction and the immediately following instruction are packed as one instruction. When it is assumed that the pack bit indicates a packed instruction when it is 1, for example, the value of the pack bit attached to the generated instruction of a 45-bit width is 1.

Furthermore, the instruction packing unit 14 extends the instruction to a 45-bit width instruction by using the 0th to 12th bits of the SXAR2 instruction and the instruction of a 32-bit width decoded at the second instruction immediately following the SXAR2 instruction. However, since the instruction is not an instruction immediately following the SXAR2 instruction, the instruction packing unit 14 generates an unpacked and extended instruction that is not packed with the SXAR2 instruction. For example, the instruction packing unit 14 generates an unpacked and extended instruction of a 45-bit width by using each field of "S_RS3 <7:5>", "S_RS2 <7:5>", "S_RS1 <7:5>", "S_RD <7:5>", and "S_SIMD" illustrated in FIG. 6, and the instruction of a 32-bit width illustrated in FIG. 10. Furthermore, in order to indicate that the generated instruction of a 45-bit width is an instruction in which the SXAR instruction and the immediately following instruction have not been packed, the instruction packing unit 14 sets to 0 the value of the "pack bit" of a 1-bit width which indicates a packed and extended instruction.

The instruction packing unit 14 extends the instruction by using instruction extension information in accordance with the instruction extension information stored in the instruction extension information register 13. Regarding the instruction immediately following the SXAR instruction, the instruction packing unit 14 further sends the packed instructions in which the SXAR instruction and the immediately following instruction have been packed as one instruction to the instruction execution unit 15. The instruction execution unit 15 decodes the instruction, executes it as one instruction, and outputs the result to the register updating unit 16. Furthermore, in the case of an instruction that has not been packed, the instruction execution unit 15 decodes the instruction as usual and executes it, and outputs the result to the register updating unit 16.

For example, when a packed and extended instruction A formed as one instruction as a result of the SXAR1 instruction and the immediately following instruction A of a 32-bit width being packed is to be executed since the pack bit is 1, the instruction execution unit 15 executes the instruction by assuming it to be one instruction. In this case, the instruction execution unit 15 performs an arithmetic operation using each operand specified at an 8-bit width of each register specifying field of a 3-bit width specified by the SXAR1 instruction, and each register specifying field ("RS3", "RS2", "RS1", and "F_RD") of a 5-bit width. For example, the instruction execution unit 15 performs an arithmetic operation using each operand that is specified by each field of "F_RS3", "F_RS2", and "F_RS1" illustrated in FIG. 4, and each field of "RS3", "RS2", and "RS1" illustrated in FIG. 10.

Then, when committing the instruction, the register updating unit 16 stores the arithmetic operation result in the destination register specified at an 8-bit width. More specifically, the register updating unit 16 stores the arithmetic operation result in the destination register specified at a width of a total of 8 bits of the register specifying field ("F_RD") of a 3-bit width specified by the SXAR1 instruction, and the register specifying field (RD) of a 5-bit width specified by such an instruction illustrated in FIG. 10. At this time, since up to the immediately following instructions that are to be extended are committed, the register updating unit 16 resets all the bits of the XAR_F part of the instruction extension information register 13. Furthermore, since the pack bit is 1, the register updating unit 16 outputs the fact that execution for two instructions has been performed to the register (program counter) 12.

Furthermore, when the packed and extended instruction A in which the SXAR2 instruction and the immediately following instruction A of a 32-bit width are packed as one instruction is to be executed, the pack bit is 1. Therefore, the instruction execution unit 15 executes the instruction as one instruction similarly to the above-described case. When this instruction is committed, the register updating unit 16 stores the arithmetic operation result in the destination register specified at a width of a total of 8 bits of the register specifying field ("F_RD") of a 3-bit width specified by the SXAR2 instruction, and the register specifying field (RD) of a 5-bit width specified by the instruction illustrated in FIG. 10. Furthermore, since up to the immediately following extended instructions are committed, the register updating unit 16 resets all the bits of the XAR_F part of the instruction extension information register 13. Furthermore, regarding the XAR_S part of the instruction extension information register 13, "S_VAL" is set to "1", and the 12th to 0th bits that are extension information specified by the SXAR2 instruction is stored in the XAR_S part. For example, the register updating unit 16 stores the values of "S_SIMD", "S_RS3", "S_RS2", "S_RS1", and "S_RD" in the XAR_S part illustrated in FIG. 4. Furthermore, since the pack bit is 1, the register updating unit 16 outputs the fact that execution for two instructions has been performed to the register (program counter) 12.

Furthermore, in the instruction execution unit 15, the SXAR2 instruction and an instruction B of a 32-bit width after two instructions are extended because the pack bit is 0, but the unpacked and extended instruction B that is not packed with the SXAR2 instruction as one instruction is to be executed. In this case, the instruction execution unit 15 performs an arithmetic operation using each operand specified at an 8-bit width of each register specifying field of a 3-bit width specified by the SXAR2 instruction, and each register specifying field of a 5-bit width specified by the instruction illustrated in FIG. 10. For example, the instruction execution unit 15 performs an arithmetic operation using each operand specified at an 8-bit width of each field of "S_RS3", "S_RS2", and "S_RS1" illustrated in FIG. 4, and each field of "RS3", "RS2", and "RS1" illustrated in FIG. 10.

Then, the register updating unit 16 stores the arithmetic operation result in a register area specified at an 8-bit width, when committing the instruction. More specifically, the register updating unit 16 stores the arithmetic operation result in a destination register specified at a total of 8 bits of a register specifying field ("S_RD") of a 3-bit width specified by the SXAR2 instruction, and the register specifying field (RD) of a 5-bit width specified by the instruction illustrated in FIG. 10. At this time, since up to the immediately following extended instructions are committed, the register updating unit 16 resets all the bits of the XAR_S part of the instruction extension information register 13. Furthermore, since the pack flag is 0, the register updating unit 16 outputs the fact that execution for one instruction has been performed to the program counter 12.

When the instruction execution unit 15 executes a packed instruction in which SXAR and the instruction immediately following SXAR are packed as one instruction by the instruction packing unit 14, and commitment that is the completion of the instruction is performed, the register updating unit 16 updates a program counter by a number corresponding to two instructions. More specifically, the register updating unit 16 updates the register (program counter) 12 by a number corresponding to two instructions in spite of the fact that execution has been performed as one instruction, when the register updating unit 16 is notified from the instruction execution unit 15 that the packed instruction has been executed. That is, when the value of the program counter that specifies the current instruction is denoted as PC, the value of the program counter is updated to PC+8 in which 8 bytes of the two-instruction length is added as two instructions to the PC rather than to PC+4 in which 4 bytes of one instruction length is added to the PC as one instruction. Furthermore, when the register updating unit 16 is notified from the instruction execution unit 15 that an instruction in which SXAR and the immediately following instruction have not been packed as one instruction has been executed, the register updating unit 16 updates the register (program counter) 12 by assuming that one instruction has been executed.

As described above, the instruction execution unit 15 and the register updating unit 16 do not use execution resources, such as an execution slot, an execution circuit, a temporary storage area for two instructions, with respect to a packing instruction in which SXAR and an immediately following instruction have been packed as one instruction. That is, the instruction execution unit 15 and the register updating unit 16 execute the instruction by using only the execution resources for one instruction similarly to an instruction that is not packed.

As described above, according to the first embodiment, it is possible to extend an instruction even in the instruction set architecture in which the instruction length is a fixed length. More specifically, in addition to a field of a 5-bit width which specifies each register contained in a typical instruction format, the instruction extension information register 13 having a field that extends by 3 bits the specification of each register is provided, so that specification using 8 bits is made possible with respect to each register, thereby making specification of 256 registers possible.

For example, in the instruction format illustrated in FIG. 10, 32 registers are specified using each field of "RS3", "RS2", "RS1", and "RD", which are register specifying fields of a 5-bit width. In contrast, in the disclosed arithmetic processing apparatus, each register specifying field of an 8-bit width can be used by using each register specifying field of a 3-bit width of SXAR in addition to the above-mentioned register specifying fields of a 5-bit width. Therefore, in the disclosed arithmetic processing apparatus, specification of 256 registers is made possible. Each register specifying field of a 3-bit width of SXAR refers to each field of "F_RS3", "F_RS2", "F_RS1", "S_RD", "S_RS3", "S_RS2", "S_RS1", and "S_RD". Furthermore, according to the first embodiment, even when the above-described extension technique is used, the packed instruction can be executed using hardware resources for one instruction by packing a prefix instruction and an extension instruction. As a result, it is possible to efficiently use hardware resources (register areas) used to execute an instruction and an extension instruction.

The disclosed arithmetic processing apparatus may include various functional units other than the configuration described in the first embodiment. Accordingly, in a second embodiment, a description will be given of an arithmetic processing apparatus having various functional units other than the configuration described in the first embodiment. When there is no particular need to distinguish between an SXAR1 instruction and an SXAR2 instruction, these will be referred to simply as SXAR.

Figure 11:
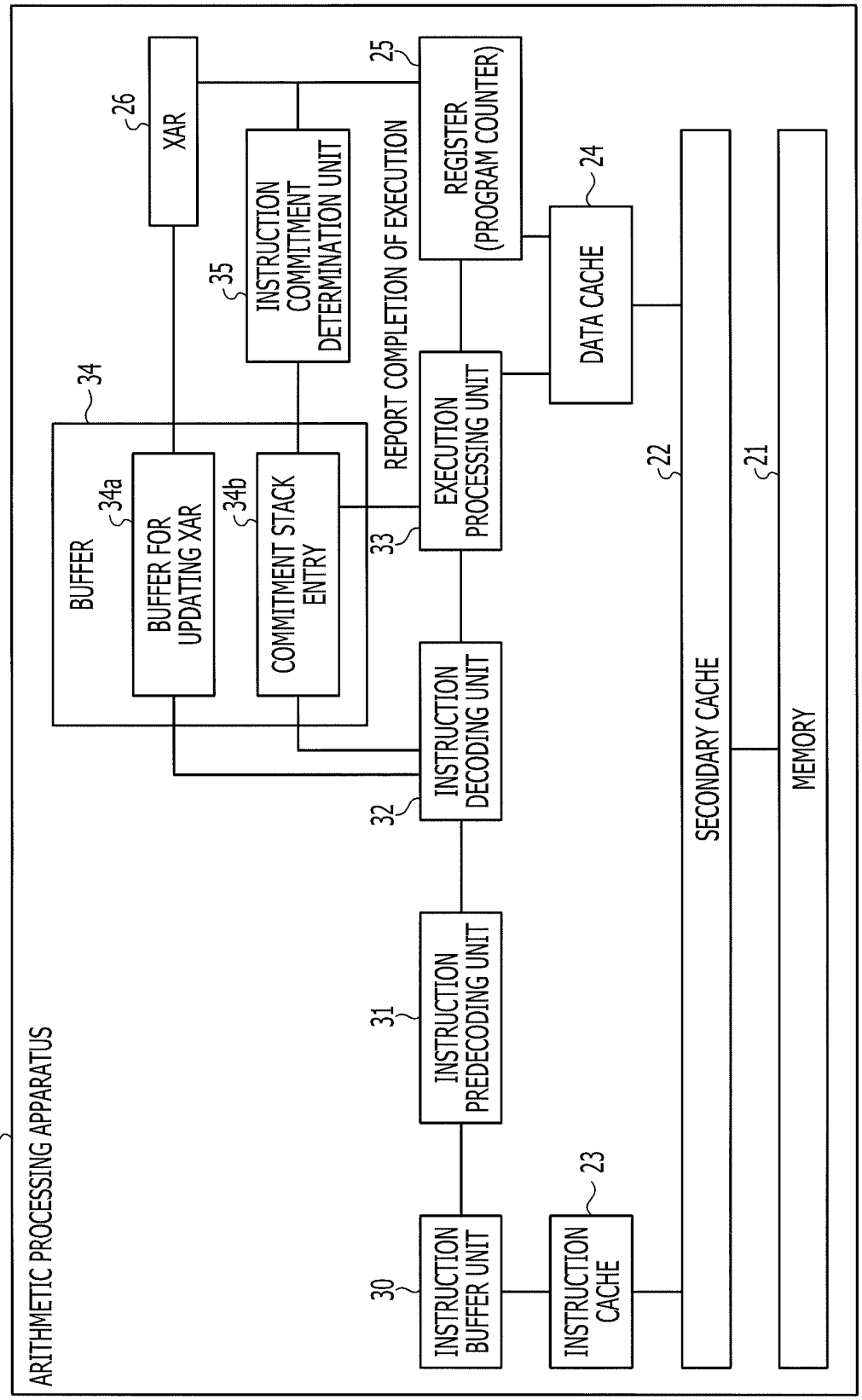
FIG. 11 is a block diagram illustrating the configuration of an arithmetic processing apparatus according to a second embodiment.

First, referring to FIG. 11, the configuration of the arithmetic processing apparatus according to the second embodiment will be described. FIG. 11 is a block diagram illustrating the configuration of an arithmetic processing apparatus according to the second embodiment.

As illustrated in FIG. 11, an arithmetic processing apparatus 20 includes a memory 21, a secondary cache 22, an instruction cache 23, a data cache 24, a register 25, and an XAR 26. Furthermore, the arithmetic processing apparatus 20 includes an instruction buffer unit 30, an instruction pre-decoding unit 31, an instruction decoding unit 32, an execution processing unit 33, a buffer 34, and an instruction commitment determination unit 35.

The memory 21 is a main storage device for storing data, programs, and the like. And the memory 21 is a semiconductor storage device (main memory) such as a RAM and a ROM, from and to which reading and writing can be directly performed by an arithmetic processing apparatus, such as a CPU. The secondary cache 22 is a cache memory for storing data and instructions that are stored in the memory 21, the data being used comparatively frequently, and the secondary cache 22 is a cache memory that can be accessed at a speed higher than that for the memory 21.

The instruction cache 23 is a cache memory in particular for storing instructions within data stored in the memory 21, the data being used comparatively frequently. And the instruction cache 23 is a cache memory that can be accessed at a speed higher than those for the memory 21 and the secondary cache 22.

The data cache 24 is a cache memory in particular for storing data other than instructions within data stored in the memory 21, the data being used comparatively frequently. And the data cache 24 is a cache memory that can be accessed at a speed higher than those for the memory 21 and the secondary cache 22. The register 25 is composed of a program counter that indicates an address in the memory 21 in which an instruction to be executed next is stored, a fixed-point register, a floating-point register, and the like.

The XAR 26 is an extended arithmetic register for storing a plurality of items of instruction extension information. More specifically, the XAR 26 is a register capable of storing instruction extension information for two instructions, which has the XAR_F part that is an extension information field of a first instruction and XAR_S that is an extension information field of a second instruction.

The XAR 26 is a register of a 28-bit width for storing instruction extension information for two instructions having the XAR_F part that is an extension information field of a first instruction and the XAR_S part that is an extension information field of a second instruction, as illustrated in FIG. 3, for example. The extension information field possessed by the instruction extension information register 13 has an "F_VAL" field indicating whether or not the extension information (data) XAR_F part of the first instruction is valid at the 27th bit, and an "F_SIMD" field that specifies operation by SIMD at the 26th bit. When, the value of the "F_SIMD" field is 1, for example, SIMD operation is performed. Furthermore, there is provided an extension portion of register specification for storing three source operands on which an arithmetic operation using an FMA instruction is to be executed, and the destination (arithmetic operation result) of the FMA instruction. More specifically, the XAR_F part has an "F_RD <7:5>" field at the 25th to 23rd bits, which specifies a destination register for storing the arithmetic operation result of the FMA arithmetic operation, an "F_RS1 <7:5>" field at the 22nd to 20th bits, which specifies a source-1 register, an "F_RS2 <7:5>" field at the 19th to 17th bits, which specifies a source-2 register, and an "F_RS3 <7:5>" field at the 16th to 14th bits, which specifies a source-3 register. XAR_F and XAR_S are reset as a consequence of the commitment of each extension instruction. Furthermore, the XAR_S part has an "S_VAL" field indicating whether or not the extension information (data) XAR_S part at the second instruction is valid at the 13th bit of the extension information field possessed by the instruction extension information register 13, and an "S_SIMD" field that specifies operation by SIMD at the 12th bit. Furthermore, there is provided an extension portion of specification of a register for storing three source operands on which an arithmetic operation using an FMA instruction is to be executed and the destination (arithmetic operation result) of the FMA instruction. More specifically, the XAR_S part has an "S_RD <7:5>" field of the 11th to 9th bits, which specifies a destination register for storing the arithmetic operation result of the FMA arithmetic operation. Furthermore, the XAR_S part has an "S_RS1 <7:5>" field at the 8th to 6th bits, which specifies a source-1 register, an "S_RS2 <7:5>" at the 5th to 3rd bits, which specifies a source-2 register, and an "S_RS3 <7:5>" field at the 2nd to 0th bits, which specifies a source-3 register.

The instruction buffer unit 30 is a storage unit that has a buffer that is a temporary storage area and that temporarily stores an instruction until the instruction read from the storage unit, such as the instruction cache 23, is executed. More specifically, the instruction buffer unit 30 reads an instruction specified by the program counter contained in the register 25 from the instruction cache 23, and stores the instruction. Furthermore, the instruction buffer unit 30 reads the instruction from the secondary cache 22 and stores it, when the instruction specified by the register 25 is not cache-hit in the instruction cache 23. Furthermore, the instruction buffer unit 30 reads the instruction from the memory 21 and stores it, when the instruction specified by the register 25 is not cache-hit in the secondary cache 22.

When the instruction read from the storage unit such as the instruction cache 23 is a prefix instruction that writes instruction extension information to the XAR 26, the instruction predecoding unit 31 packs the prefix instruction and the instruction that is decoded immediately following the prefix instruction as one instruction. More specifically, a description will be given by using, as an example, a case in which the instruction that is decoded immediately following the SXAR1 instruction is an FMA instruction of SPARC JPS1 specification. The instruction predecoding unit 31 generates a packed and extended instruction of a 45-bit width by using the extension information at the 13th to 25th bits of the SXAR1 instruction and the subsequent instruction of a 32-bit width. For example, the instruction predecoding unit 31 generates a packed and extended instruction of a 45-bit width by each field of "F_RS3 <7:5>", "F_RS2 <7:5>", "F_RS1 <7:5>", "F_RD <7:5>", and "F_SIMD" illustrated in FIG. 4, and the FMA instruction illustrated in FIG. 10. Furthermore, the instruction predecoding unit 31 attaches "pack bit=1" of a 1-bit width information to the generated packed and extended instruction of a 45-bit width, and the "pack bit=1" indicates that the instruction is an instruction in which SXAR and the immediately following instruction are packed as one instruction.

Next, the case of an SXAR2 instruction will be described. While the SXAR2 instruction and the immediately following instruction are packed as one instruction, the instruction predecoding unit 31 generates a packed and extended instruction of a 45-bit width by using the extension information at the 13th to 25th bits of the SXAR2 instruction and the subsequent instruction of a 32-bit width. For example, the instruction predecoding unit 31 generates a packed and extended instruction of a 45-bit width in which each field of "F_RS3 <7:5>", "F_RS2 <7:5>", "F_RS1 <7:5>", "F_RD <7:5>", and "F_SIMD" illustrated in FIG. 4 and the instruction illustrated in FIG. 10 are packed. Furthermore, the instruction predecoding unit 31 attaches "pack bit=1" of a 1-bit width information to the generated packed and extended instruction of a 45-bit width. And, the "pack bit=1" indicates that the instruction and the instruction immediately following the SXAR instruction are packed as one instruction.

Furthermore, the instruction predecoding unit 31 generates an unpacked and extended instruction of a 45-bit width by using the extension information at the 0th to 12th bits of the SXAR2 instruction and the instruction of a 32-bit width at the subsequent second instruction. For example, the instruction predecoding unit 31 generates an unpacked and extended instruction of a 45-bit width in which each field of "S_RS3 <7:5>", "S_RS2 <7:5>", "S_RS1 <7:5>", "S_RD <7:5>", and "S_SIMD" illustrated in FIG. 4, and the instruction illustrated in FIG. 10 are packed. Furthermore, in order to indicate that the generated unpacked and extended instruction of a 45-bit width is an instruction in which the SXAR instruction and the immediately following instruction to the SXAR instruction have not been packed, the instruction predecoding unit 31 sets the value of "pack bit" of a 1-bit width to 0.

Figure 12:
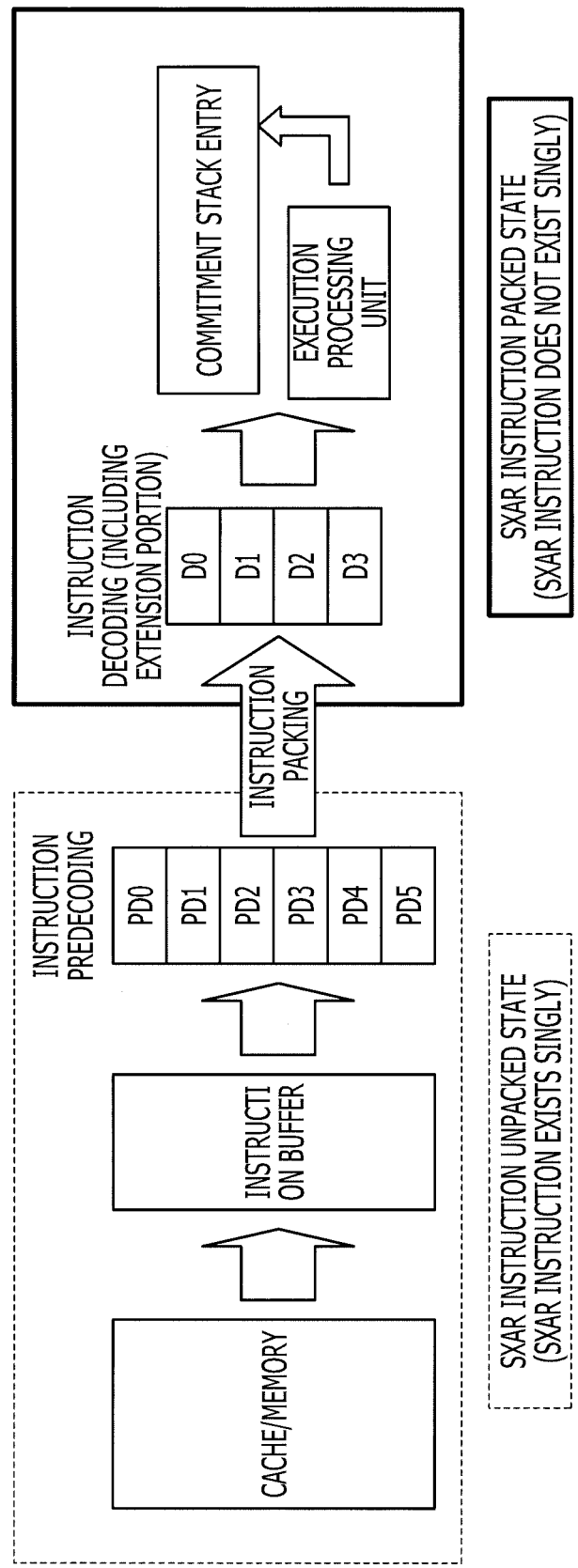
FIG. 12 illustrates packing of a prefix instruction SXAR.

Then, the instruction predecoding unit 31 has an instruction predecoding slot capable of storing instruction opcodes of a fixed instruction length, such as prefix instructions (SXAR1 instruction and SXAR2 instruction), and extended instructions. In the stage at and subsequent to the instruction decoding unit 31, execution resources are allocated to effective packed instructions. Therefore, as illustrated in FIG. 12, up to the instruction predecoding stage, the prefix instruction SXAR exists singly. However, in the stage at and subsequent to the instruction decoding, the prefix instruction SXAR does not exist singly, since the prefix instruction SXAR has been packed. For this reason, the prefix instruction does not consume many commitment stack entries and simultaneous instruction commitments, thereby making it possible to suppress an increase in the instruction execution resources. Furthermore, the instruction predecoding unit 31 generates a pack flag indicating that the instruction has been packed with respect to the packed instructions, notifies the slot of the instruction decoding unit 32 of a flag indicating that the instruction has been packed to, and stores this flag in the commitment stack entry. FIG. 12 illustrates packing of a prefix instruction SXAR.

The instruction decoding unit 32 decodes a packed instruction that has been packed with SXAR as one instruction by the instruction predecoding unit 31. More specifically, the instruction decoding unit 32 decodes a packed and extended instruction "45 bits+(pack flag=1)" received from the instruction predecoding unit 31, and outputs it to an execution processing unit 33 and a commitment stack entry 34*b*. The instruction decoding unit 32 decodes an unpacked and extended instruction "45 bits+(pack flag=0)" to be extended which has not been packed, the instruction being received from the instruction predecoding unit 31, and outputs the instruction to the execution processing unit 33 and the commitment stack entry 34*b*.

Figure 13:
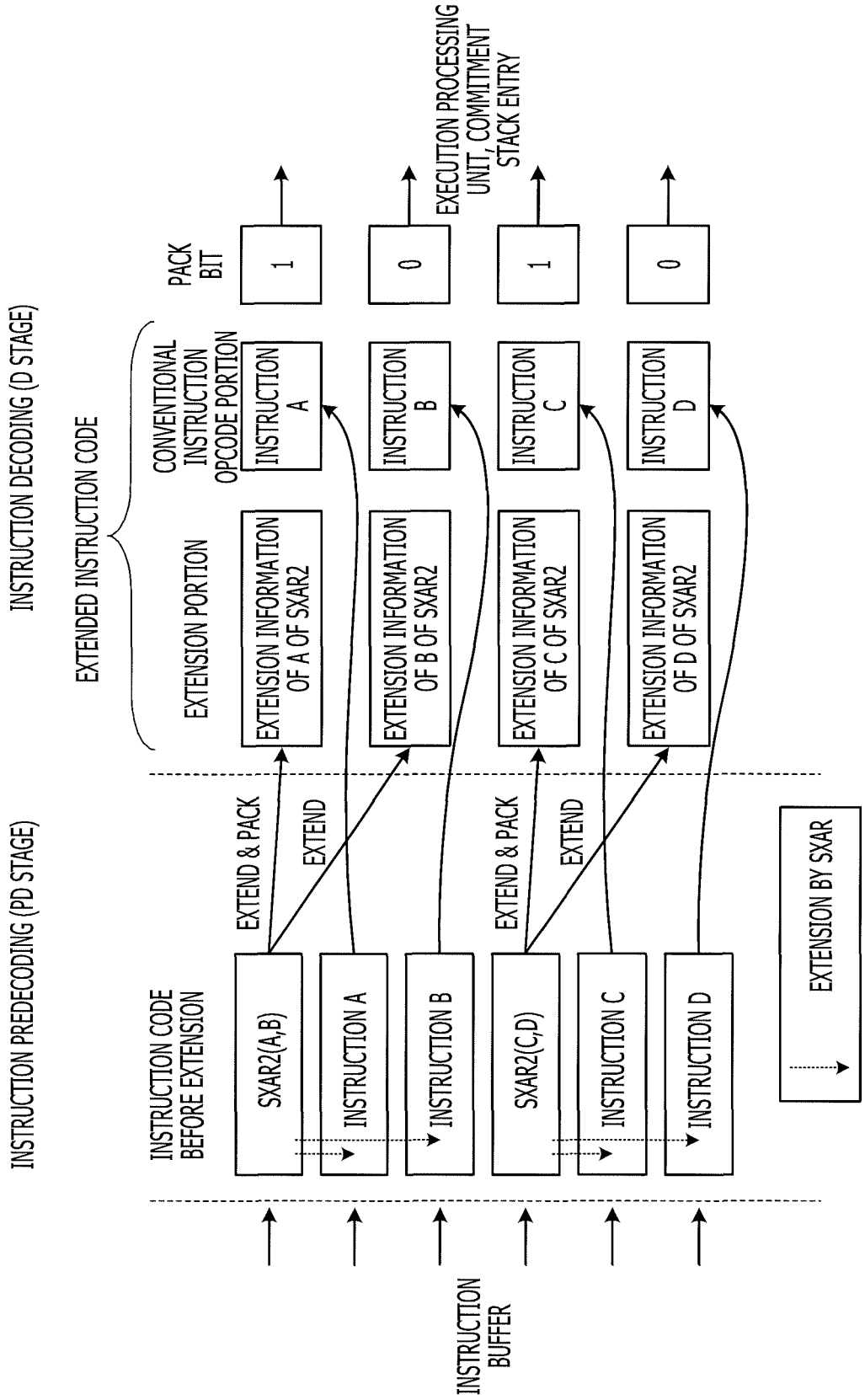
FIG. 13 illustrates extension of an instruction using a prefix instruction SXAR, packing with the immediately following instruction, and the number of slots.

Furthermore, since the SXAR instruction has been packed with the immediately following instruction, the number of instruction slots of the instruction decoding unit 32 may be smaller than the number of slots of the instruction predecoding unit. Here, a description will be given on the assumption that an SXAR2 instruction for which extension for a maximum of two instructions is possible is used by a compiler. In this case, when the number of effective instruction slots (the number when the prefix instruction SXAR is set to 0) of the instruction decoding unit 32 is set to N, and if N is an even number, the number of the instruction slots of the instruction predecoding unit 31 is a total of (3N/2), when (N/2) is added to N. If N is an odd number, (N/2+0.5) should be added to N so as to provide a total of (3N/2+0.5). For example, as illustrated in FIG. 10, when N=4, whereas the number of instruction slots of the instruction decoding unit 32 is 4, the number of instruction slots of the instruction predecoding unit 31 is 6. FIG. 13 illustrates extension of an instruction using the prefix instruction SXAR, packing with the immediately following instruction, and the number of instruction slots.

The execution processing unit 33 executes the instruction decoded by the instruction decoding unit 32. More specifically, the execution processing unit 33 executes the instruction as a packed one instruction so as to refer to the data cache 24 and the register 25, and outputs the result to the other functional units that are connected, when the decoded instruction is a packed and extended instruction "45 bits+(pack flag=1)". Furthermore, the execution processing unit 33 executes the instruction as usual so as to refer to the data cache 24 and the register 25, and outputs the result to the other functional units, when the decoded instruction is an ordinary instruction that has not been packed.

For example, the execution processing unit 33 executes an arithmetic operation by using each operand stored in a register that is specified at an 8-bit width, in which each register specifying field of a 3-bit width specified by the SXAR1 instruction, and each register specifying field of a 5-bit width of the subsequent instruction are combined. For example, the execution processing unit 33 executes an arithmetic operation using each operand stored in a register specified at an 8-bit width, in which each field of "F_RS3", "F_RS2", and "F_RS1" illustrated in FIG. 4 and each field of "RS3", "RS2", and "RS1" illustrated in FIG. 10 are combined. Then, the instruction commitment determination unit 35 stores the arithmetic operation result in the destination register specified at an 8-bit width at the time of instruction commitment. More specifically, the instruction commitment determination unit 35 stores the arithmetic operation result in the destination register that is specified at a width of a total of 8 bits of the register specifying field ("F_RD") of a 3-bit width specified by the SXAR1 instruction, and the register specifying field (RD) of a 5-bit width specified by the instruction illustrated in FIG. 10. At this time, the execution processing unit 33 executes a packed and extended instruction in which two instructions have been packed by using only the execution resources for one instruction similarly to the instruction that has not been packed without using execution resources for two instructions. And, since the instruction commitment determination unit 35 commits the extension instruction, the instruction commitment determination unit 35 resets all the bits of the XAR_F part of the XAR 26 at the time of instruction commitment. Furthermore, since the pack bit is 1, the instruction commitment determination unit 35 outputs the fact that execution for two instructions has been performed to the register 25.

And, the execution processing unit 33 executes an arithmetic operation using each operand stored in a register that is specified at an 8-bit width of each register specifying field of a 3-bit width specified by the SXAR2 instruction, and each register specifying field of a 5-bit width of the subsequent instruction. For example, the execution processing unit 33 executes an arithmetic operation using each operand stored in a register that is specified at an 8-bit width of each field of "F_RS3", "F_RS2", and "F_RS1" illustrated in FIG. 4, and each field of "RS3", "RS2", and "RS1" illustrated in FIG. 10. Then, the instruction commitment determination unit 35 stores the arithmetic operation result in the register area that is specified at an 8-bit width, at the time of instruction commitment. More specifically, the instruction commitment determination unit 35 stores the arithmetic operation result in the destination register that is specified at a width of a total of 8 bits, in which the register specifying field ("F_RD") of a 3-bit width that is specified by the SXAR2 instruction, and the register specifying field (RD) of a 5-bit width that is specified by the instruction illustrated in FIG. 10 are combined. And, since the instruction commitment determination unit 35 commits the extension instruction, the instruction commitment determination unit 35 resets all the bits of the XAR_F part of the XAR 26 at the time of instruction commitment. Furthermore, regarding the XAR_S part of the XAR 26, the "S_VAL" field is set to "1", and the 12th to 0th bits, which are extension information that is specified by the SXAR2 instruction, are stored. And, since the pack bit is 1, the instruction commitment determination unit 35 outputs the fact that execution for two instructions has been performed to the register 25.

And, the execution processing unit 33 executes an arithmetic operation using each operand specified in a register that is stored at an 8-bit width of each register specifying field of a 3-bit width that is specified by the SXAR2 instruction and each register specifying field of a 5-bit width that is specified by the instruction of the subsequent second instruction. For example, the execution processing unit 33 executes an arithmetic operation using each operand stored in a register that is specified at an 8-bit width in which each field of "S_RS3", "S_RS2", and "S_RS1" illustrated in FIG. 4, and each field of "RS3", "RS2", and "RS1" illustrated in FIG. 10 are combined. Then, the instruction commitment determination unit 35 stores the arithmetic operation result in the destination register that is specified at an 8-bit width at the time of instruction commitment. More specifically, the instruction commitment determination unit 35 stores the arithmetic operation result in the destination register that is specified at a width of a total of 8 bits of the register specifying field ("S_RD") of a 3-bit width that is specified by the SXAR2 instruction, and the register specifying field (RD) of a 5-bit width that is specified by the instruction illustrated in FIG. 10. Furthermore, since the instruction commitment determination unit 35 commits the extension instruction, the instruction commitment determination unit 35 resets all the bits of the XAR_S part of the XAR 26, at the time of instruction commitment.

The buffer 34 has a buffer 34a for updating XAR and a commitment stack entry 34b, and temporarily stores information for updating the XAR 26 and information used to commit (complete) the executed instruction. Here, although the buffer 34a for updating XAR and the commitment stack entry 34b are illustrated as separate areas, these are not limited to this example, and can be formed as one area (buffer) by providing a field that specifies the buffer 34a and the commitment stack entry 34b.

The buffer 34a for updating the XAR stores information used to update the XAR 26 when the prefix instruction SXAR1 is executed. More specifically, for example, when, an interrupt occurs between the prefix instruction SXAR and the subsequent instruction that is to be extended, the information (extension information) of the prefix instruction is stored in the XAR 26 after the interrupt process is completed. by referring to this information, the instruction can be correctly extended. Therefore, the buffer 34a for updating the XAR is used to store the information (the extension information of the SXAR) to be written to the XAR 26 from when the prefix instruction is decoded until it is committed.

The commitment stack entry 34b temporarily stores information necessary for instruction commitment. More specifically, the commitment stack entry 34b temporarily stores information, such as the execution result. That is, the commitment stack entry 34b temporarily stores the execution result, the extension information, and the like from when the commitment process is executed until the XAR 26 and the register 25 are updated.

The instruction commitment determination unit 35 determines whether or not commitment is possible based on the beginning instruction in the commitment stack entry 34b, and performs a commitment process. More specifically, the instruction commitment determination unit 35 selects an instruction for a commitment candidate from the commitment stack entry 34b, and makes a determination as to whether the instruction of the commitment candidate can be committed. For example, the instruction commitment determination unit 35 performs the updating of the XAR 26 and the data cache 24 by using the SXAR instruction, and the updating of the resources of the extended instruction. At this time, when the pack bit of the commitment candidate is 1, in the case that the value of the register 25 that specifies the current instruction is denoted as PC, the instruction commitment determination unit 35 updates the value of the register 25th to PC+8 in which 8 bytes of a two-instruction length is added to the PC as the amount for two instructions rather than to PC+4 in which 4 bytes of one instruction length is added to PC as an amount for one instruction. When the pack bit of the commitment candidate is 0, in the case that the value of the register 25 that specifies the current instruction is denoted as PC, the instruction commitment determination unit 35 updates the value of the register 25 to PC+4 in which 4 bytes of a one instruction length is added to PC as an amount for one instruction.

Figure 14:
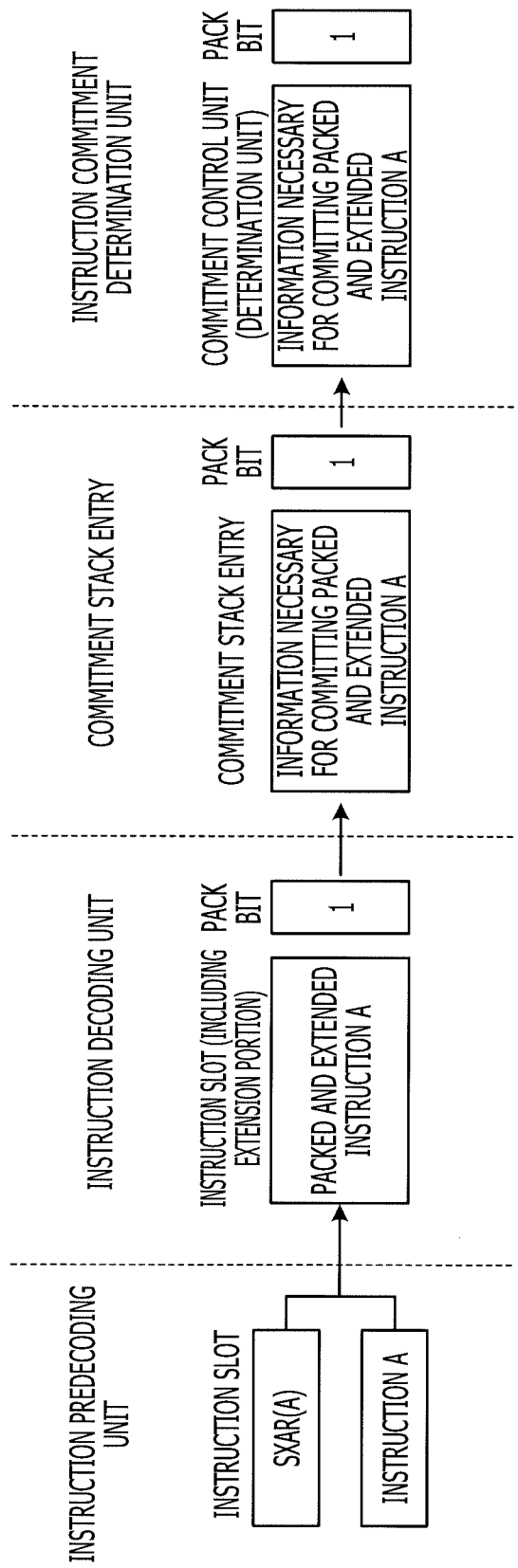
FIG. 14 illustrates a shift from when an instruction is extended until the instruction packed with the SXAR instruction is committed.

Here, a description will be given of the shift of the packed and extended instruction A from the instruction predecoding units 31, the instruction decoding units 32, the commitment stack entries 34b, and the instruction commitment determination unit 35. As illustrated in FIG. 14, the instruction predecoding unit 31 packs an SXAR (A) and an instruction A, and outputs them as one instruction to the instruction decoding unit 32. When the input instruction is a packed and extended instruction A, the instruction decoding unit 32 outputs, for example, "pack bit=1" as information indicating that these have been packed, to the commitment stack entry 34b and the execution processing unit 35. After that, in the commitment stack entry 34b, as a consequence of the execution of the execution processing unit 35, information necessary to commit the packed and extended instruction A, and a pack bit indicating the fact of being extended are stored in such a manner as to be associated with each other. As a result of the commitment of the packed and extended instruction, in the instruction commitment determination unit 35, the value of the register 25 is updated to PC+8 in which 8 bytes of a two-instruction length is added to PC as an amount for two instructions. FIG. 14 illustrates a shift until the instruction is extended and the instruction packed with an SXAR instruction is committed.

In the instruction predecoding unit 31, since the number of instruction slots is greater than that of the next instruction decoding unit 32, it is considered that some of the instructions that cannot be shifted from the instruction predecoding unit 31 to the next instruction decoding unit 32 remain. For this reason, it is necessary for the instruction predecoding unit 31 to perform the next instruction presentation while viewing the remaining state of the instructions in the slots. Furthermore, there occurs a need to control the position of the available slot from which presentation can be performed, and the operation becomes complicated. In order to avoid this, the instruction predecoding unit 31 performs control so that all the instructions can simultaneously shift to the next instruction decoding unit 32.

More specifically, the instruction predecoding unit 31 views how many of SXAR instructions used for instruction extension in the stage are contained, and adjusts the number of instruction presentations. When one or more SXAR instructions are contained in N instructions from the beginning of the instruction buffer 30, which are selected from the instruction buffer 30, the instruction predecoding unit 31 sends the (N+1)th instruction to the instruction decoding unit 32. Then, when two or more SXAR instructions are contained in the N+1 instructions from the beginning, the instruction predecoding unit 31 sends the (N+2)nd instruction to the instruction decoding unit 32. As a result of the above, if the SXAR instruction is not contained in the range, instruction presentation is performed without burying all the slots of the instruction predecoding unit 31. In the instruction predecoding unit 31, it becomes possible to simultaneously shift all the instructions to the next instruction decoding unit 32 while the presented instruction is always packed (coupled) to N or less effective instructions.

Figure 15:
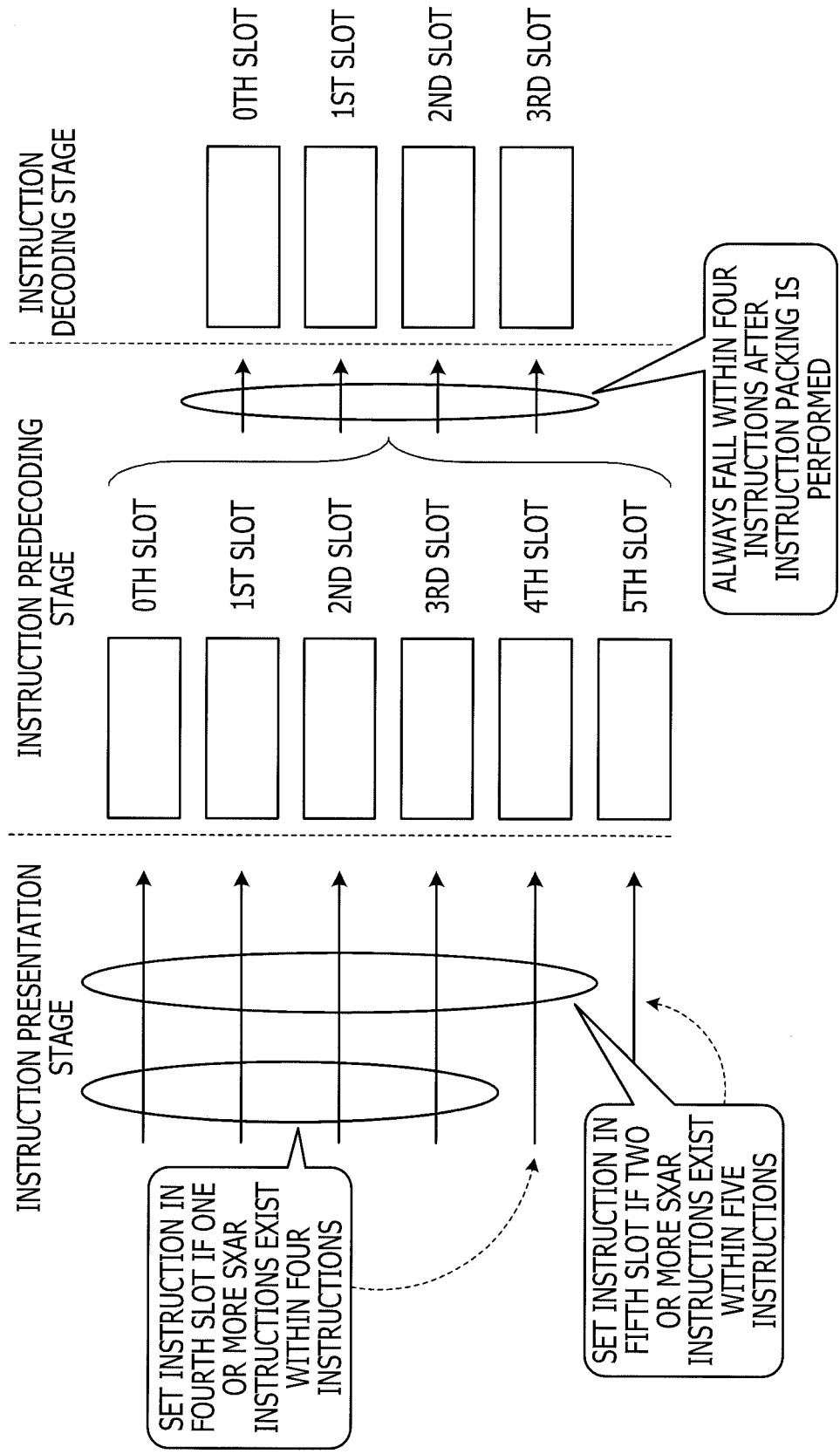
FIG. 15 illustrates an example of the adjustment of the number of instruction presentations.

An example in which, for example, N=4 is illustrated in FIG. 15. In FIG. 15, when one or more SXAR instructions (SXAR1 instruction and SXAR2 instruction) are contained in four instructions from the beginning of the instruction buffer unit 30, which are selected from the instruction buffer unit 30, the instruction predecoding unit 31 sends the fifth instruction to the instruction decoding unit 32. Furthermore, when two or more SXAR instructions are contained in five instructions from the beginning, the instruction predecoding unit 31 sends the sixth instruction to the instruction decoding unit 32. As a result of the above, if the SXAR instruction is not contained in the range, instruction presentation is performed without burying all the slots of the instruction predecoding unit 32. In the instruction predecoding unit 31, while the instructions that have been presented are always packed to four or less effective instructions, all the instructions can be shifted to the next instruction decoding unit 32. However, it is recommended that, as a presumption, when instruction extension of two consecutive instructions is performed, the compiler uses an SXAR2 instruction. FIG. 15 illustrates an example of the adjustment of the number of instruction presentations.

Figure 16:
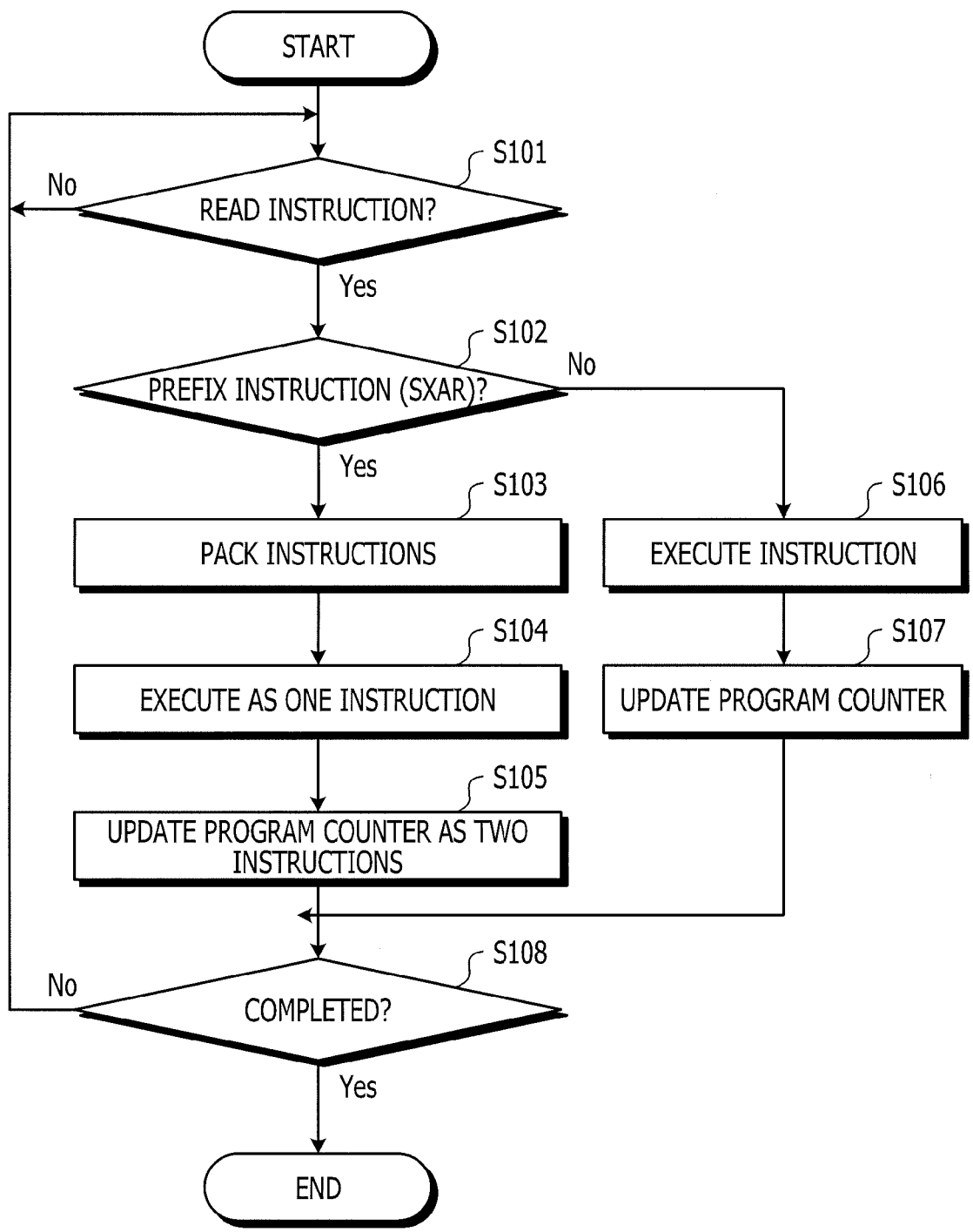
FIG. 16 is a flowchart illustrating the flow of processing in an arithmetic processing apparatus according to the second embodiment.

Next, a description will be given of the flow of the processing of an arithmetic processing apparatus according to the second embodiment. FIG. 16 is a flowchart illustrating the flow of the processing in the arithmetic processing apparatus according to the second embodiment. When there is no particular need to distinguish between an SXAR1 instruction and an SXAR2 instruction, these will be simply described as "SXAR".

As illustrated in FIG. 16, the instruction buffer unit 30 of the arithmetic processing apparatus 20 reads an instruction specified by the register 25 from the instruction cache 23, and stores the instruction (YES in step S101). Then, the instruction predecoding unit 31 determines whether or not the read instruction is a prefix instruction SXAR (step S102).

When the read instruction is a prefix instruction SXAR (YES in step S102), the instruction predecoding unit 31 generates a packed and extended instruction in which SXAR and the subsequent instruction are packed as one instruction (step S103). Next, the instruction decoding unit 32 decodes the packed and extended instruction that has been packed, and attaches a flag indicating a packed and extended instruction. Thereafter, the execution processing unit 33 executes the packed and extended instruction as one instruction (step S104).

After that, when the instruction commitment determination unit 35 determines that the executed packed and extended instruction can be committed, the instruction commitment determination unit 35 resets the XAR 26, and updates the register 25 by assuming that two instructions have been executed (step S105).

The process returns to step S102, where when the read instruction is not an SXAR instruction (NO in step S102), the instruction predecoding unit 31 outputs the instruction to the instruction decoding unit 32 without packing two instructions. The instruction decoding unit 32 decodes the input instruction, and the execution processing unit 33 executes the decoded instruction (step S106). After the execution of the decoded instruction by the and the execution processing unit 33, when the instruction commitment determination unit 35 determines that the executed ordinary instruction can be committed, the instruction commitment determination unit 35 updates the register 25 by assuming that one instruction has been executed (step S107).

Then, when the processing continues (NO in step S108), the process returns to step S101, where the arithmetic processing apparatus 20 repeatedly performs the subsequent processing, and when the processing does not continue (YES in step S108), the processing is completed.

As described above, according to the second embodiment, even in the instruction set architecture in which the instruction length is a fixed length, the extension of an instruction can be performed. Furthermore, according to the second embodiment, even when the above-described extension technique is used, the prefix instruction and the extension instruction can be packed, and these instructions can be executed using resources for one instruction. As a result, it is possible to efficiently use resources (areas) used for executing instructions and extension instructions.

There is a case in which, although a packing process (coupling process) has been performed by the instruction predecoding unit 31, a trap process, such as exception, becomes necessary due to an immediately following instruction, which is packed with an SXAR instruction. That is, a case is expected in which in software, up to the SXAR instruction have been committed in a state in which the immediately following instruction is not committed and the process is shifted to a trap process.

Even in such a case, it is possible for the disclosed arithmetic processing apparatus to perform a trap process (interrupt process) without problems, and to execute a packed instruction without problems after the trap process has been performed. Accordingly, a description will be given of processing in a case where a trap process occurs after a packing process in a third embodiment.

More specifically, when it is necessary to shift to a trap process, the instruction commitment determination unit 35 that makes a determination as to instruction commitment confirms the pack bit that indicates that a packed instruction has been packed. Then, when the pack bit is 1, the instruction commitment determination unit 35 does not shift to the trap process for the instruction, cancels all pipelines, and performs over again starting from the fetching of an instruction.

Figure 17:
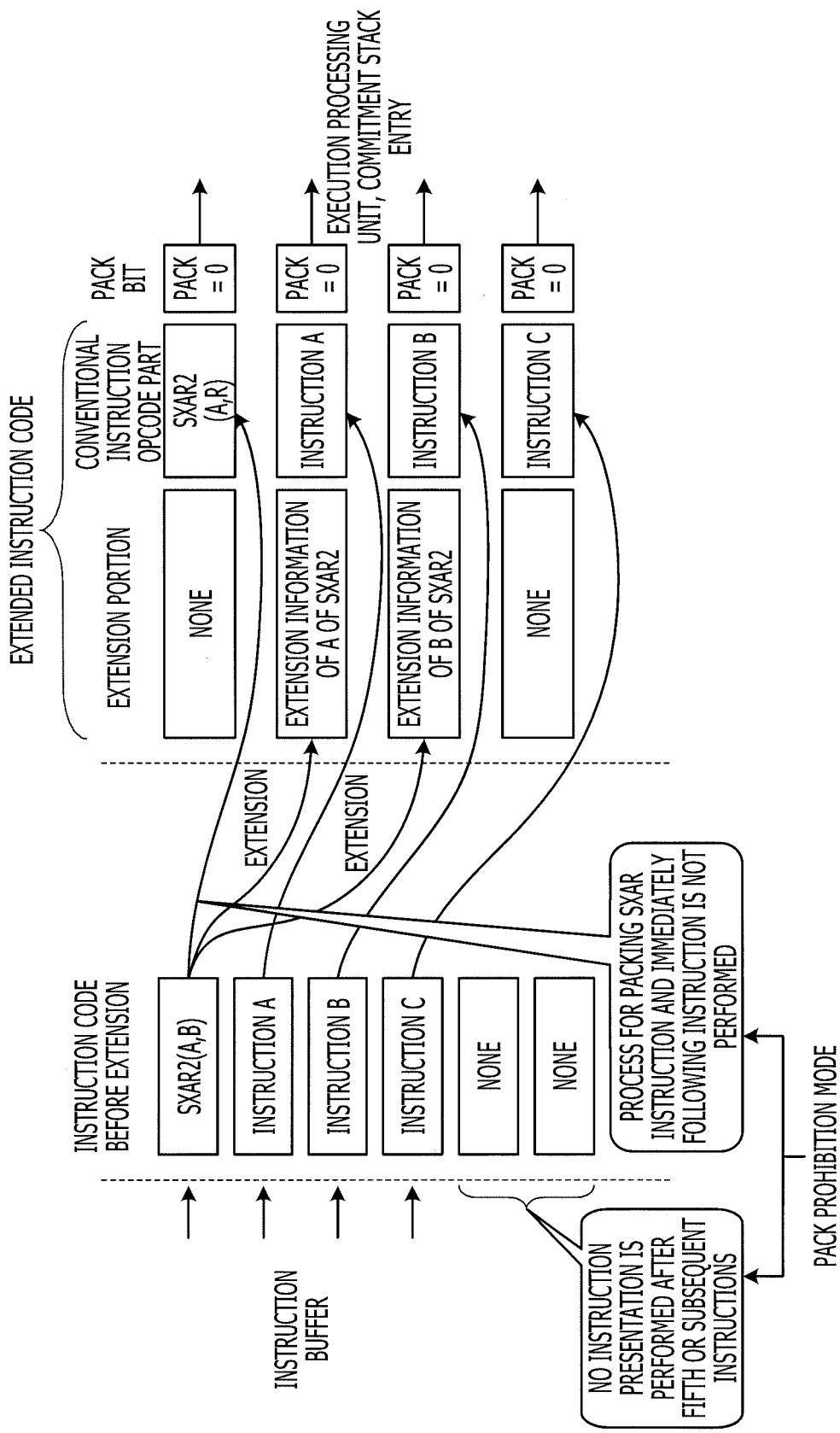
FIG. 17 illustrates re-instruction fetching, instruction pre-decoding, and instruction decoding that are performed in a case where a trap process occurs after a packing process.

For example, when the instruction commitment determination unit 35 originates an unpack rerun control signal indicating a redo process, the instruction predecoding unit 31 receiving this signal performs control so that instruction presentation of five or more instructions is performed, as illustrated in FIG. 17. Furthermore, the instruction predecoding unit 31 does not perform a coupling (packing) process for the prefix instruction SXAR and the immediately following instruction. In the redo process in this unpack rerun mode, since a pack process is not performed, the prefix instruction SXAR and the immediately following instruction use separate commitment stack entries 34b. As a result, in the case of an exception due to the immediately following instruction, after the SXAR instruction is committed, it becomes possible to shift to a trap in response to the immediately following instruction. FIG. 17 illustrates re-fetching of an instruction performed when a trap process occurs after a packing process.

Figure 18:
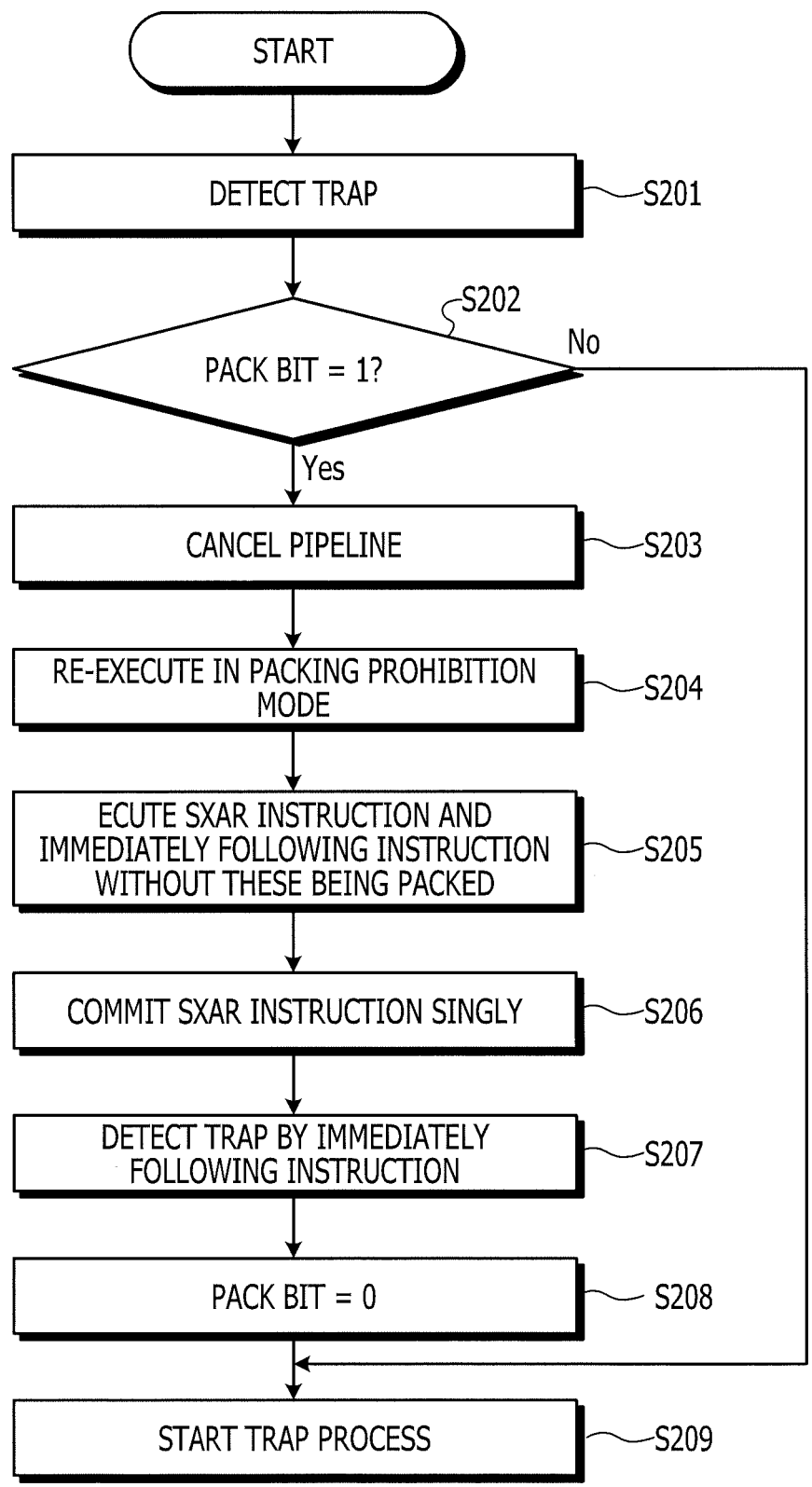
FIG. 18 is a flowchart illustrating the flow of processing in a case where a trap process occurs after a packing process.

A description will be given of the flow of the above-described processing, that is, the flow of the processing in a case where a trap process occurs after a packing process. FIG. 18 is a flowchart illustrating the flow of processing in a case where a trap process occurs after a packing process.

As illustrated in FIG. 18, when the instruction commitment determination unit 35 detects a trap process (step S201), the instruction commitment determination unit 35 determines whether or not the pack bit of the instruction is "1" (step S202).

Then, when the pack bit of the instruction that is being currently executed is "1" (YES in step S202), the instruction commitment determination unit 35 originates an unpack rerun control signal indicating a redo process to each control unit and the like, and cancels the pipeline (step S203).

Next, the instruction predecoding unit 31 re-executes the instruction in a packing prohibition mode (step S204), and outputs the instruction to the instruction decoding unit 32 without packing the prefix instruction SXAR and the immediately following instruction. Then, the instruction decoding unit 32 separately decodes the prefix instruction SXAR and the immediately following instruction (step S205). The execution processing unit 33 and the instruction commitment determination unit 35 execute and commit the prefix instruction SXAR singly (step S206).

After the execution and commitment of the prefix instruction SXAR, the execution processing unit 33 and the instruction commitment determination unit 35 detect a trap in response to the instruction immediately following the executed SXAR (step S207), confirms that the pack bit of the instruction is "0" (step S208), and performs a trap process (step S209).

On the other hand, the process returns to step S202, where, when the pack bit of the executed instruction that is being currently executed is not "1" (NO in step S202), the instruction commitment determination unit 35 directly performs a trap process (step S209).

As described above, according to the third embodiment, in a state in which up to the prefix instruction SXAR have been committed, even when it is necessary to shift to a trap process without committing the immediately following instruction, it is possible to perform a trap process without problems, and it is possible to perform the packed instruction after the trap process is performed.

Next, a description will be given of the control and the configuration of the updating of the XAR 26 of the prefix instruction SXAR. As described above, the disclosed arithmetic processing apparatus is designed to control packing of the SXAR1 instruction that extends only the immediately following one instruction and the SXAR2 instruction that extends two immediately following instructions. Furthermore, after extension information is set in the XAR_F part and the XAR_S part of the XAR 26 (instruction extension register), the extension information is reset when the instruction to be extended is committed.

Here, a description will be given of control necessary for setting and resetting, and the structure of a buffer. Here, although the structure of the commitment stack entry 34b is described, it is not necessarily necessary to apply the structure to the commitment stack entry 34b. The structure can be applied to one buffer 34 in which the buffer 34a for updating an XAR and the commitment stack entry 34b are integrated, for example.

First, a description will be given of setting and resetting control on the XAR_F part of the XAR 26. Both the SXAR1 instruction and the SXAR2 instruction are reset when the XAR_F part is set and the instruction extended by the XAR_F is committed. First, the SXAR1 instruction will be described.

Figure 19:
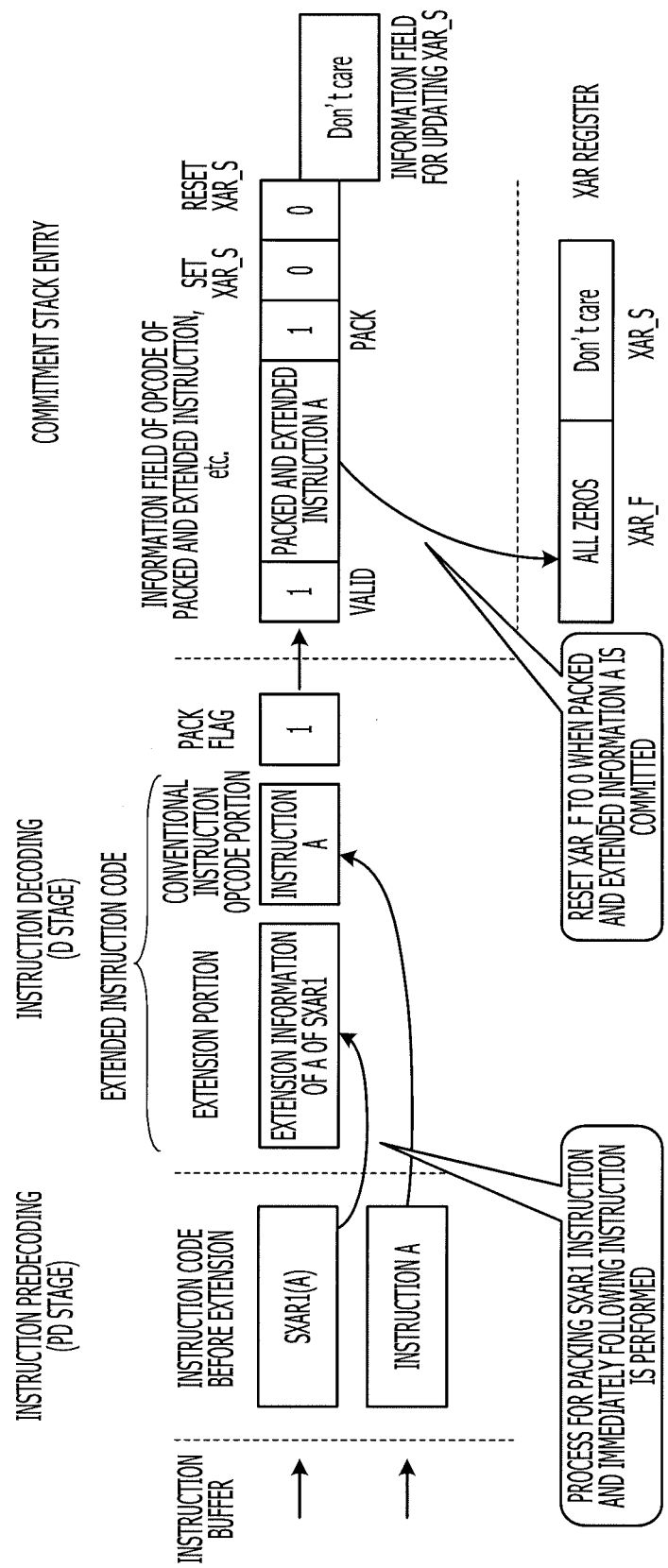
FIG. 19 illustrates the flow of processing of an instruction packed with an SXAR1 instruction.

As illustrated in FIG. 19, the instruction predecoding unit 31 generates a packed and extended instruction A in which the SXAR1 instruction and the immediately following instruction are packed as one instruction, and the instruction decoding unit 32 decodes the packed and extended instruction A. Then, the execution processing unit 33 executes the packed and extended instruction A. Furthermore, the execution processing unit 33 stores, for example, information, such as the opcode of the packed and extended instruction A, in the commitment stack entry 34b. After that, when the instruction commitment determination unit 35 commits the packed and extended instruction A, the instruction commitment determination unit 35 resets to zero, the extension information to be stored in the XAR_F of the XAR 26. For this reason, when the SXAR1 instruction is packed, it is not necessary to particularly have data to be written, and it is also not necessary to store the information of the SXAR1 instruction in the commitment stack entry 34b.

Figure 20:
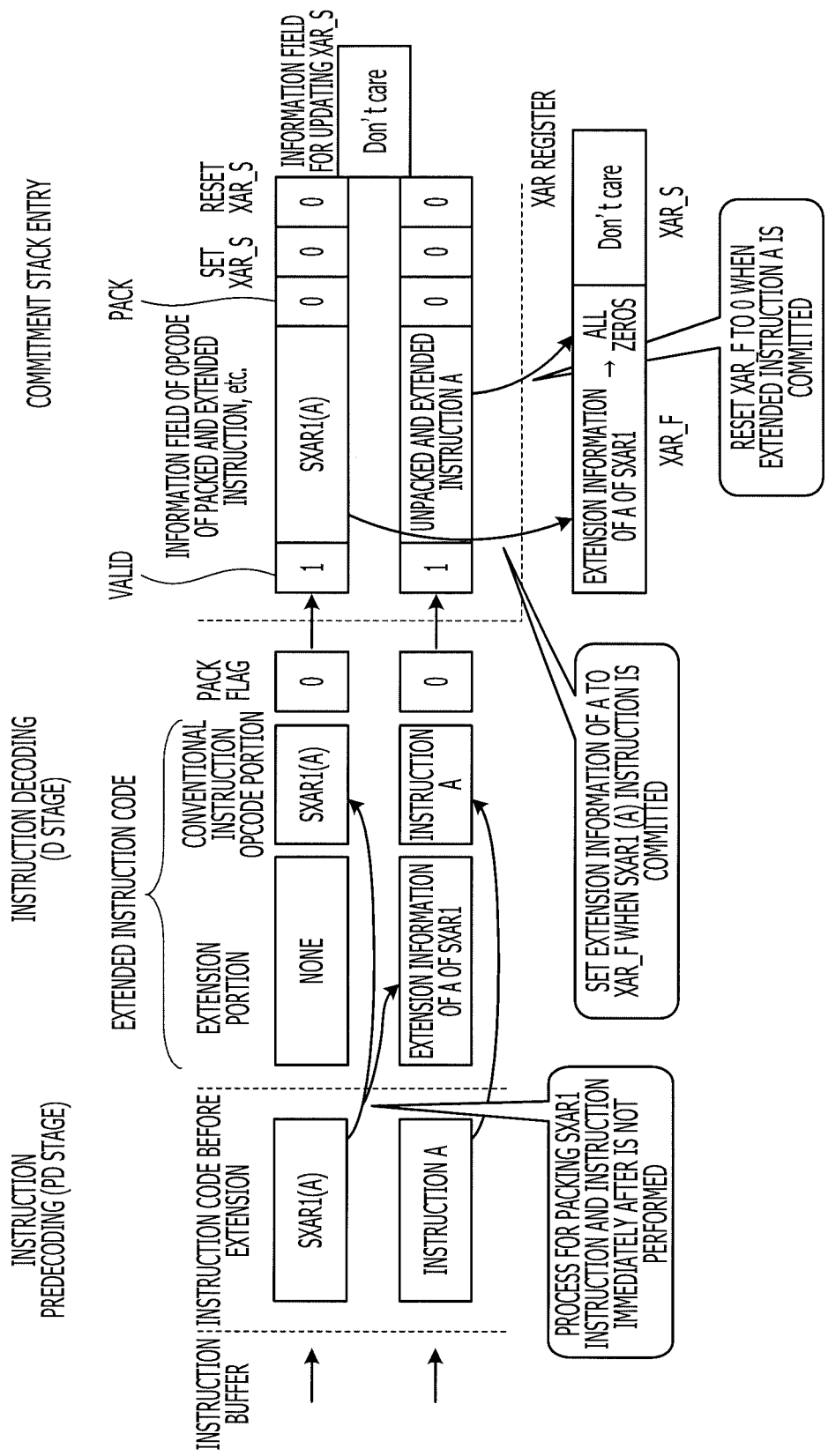
FIG. 20 illustrates the flow of processing of an instruction that is not packed with an SXAR1 instruction.

On the other hand, there is a case in which the instruction decoding of the SXAR1 instruction is performed without being packed with the subsequent instruction in the above-described unpack rerun mode, or the like. In this case, since the instruction predecoding unit 31 does not process an instruction in which the SXAR1 instruction and the immediately following instruction are packed, the instruction decoding unit 32 decodes the SXAR1 (A) singly in advance, as illustrated in FIG. 20. Then, the information of the SXAR1 (A) is stored in the commitment stack entry 34b. After that, when the instruction commitment determination unit 35 commits the SXAR1 (A), the extension information of the SXAR1 (A) ("F_SIMD", "F_RS3", "F_RS2", "F_RS1", and "F_RD") is stored in the XAR_F part of the XAR 26.

Next, the instruction decoding unit 32 decodes the unpacked and extended instruction A in which the instruction A that is a subsequent instruction of the SXAR1 instruction is extended by using the extension information of the SXAR1 (A) in which the instruction A that is a subsequent instruction of the SXAR1 instruction is stored in the XAR_F part of the XAR 26. Then, the execution processing unit 33 executes the decoded unpacked and extended instruction A. When the instruction commitment determination unit 35 commits the subsequent instruction A of the SXAR1 instruction, the instruction commitment determination unit 35 resets the value of the XAR_F to zero. When the SXAR is not packed, regarding information necessary for instruction commitment, an ordinary register number to be written is unnecessary, for example. Therefore, for another instruction, by assigning the field used for another application to information to be written to the instruction extension register of the SXAR instruction, it is possible to suppress an increase in necessary resources.

Furthermore, in a case where, regarding the SXAR2 instruction, the SXAR2 instruction and the immediately following instruction are packed and processed as one instruction, when the instruction commitment determination unit 35 commits the extension instruction, the instruction commitment determination unit 35 resets the value of the XAR_F part of the XAR 26 to zero. Therefore, the instruction commitment determination unit 35 does not have extension information for the XAR_F part contained in the SXAR2 instruction, and performs only resetting.

Figure 21:
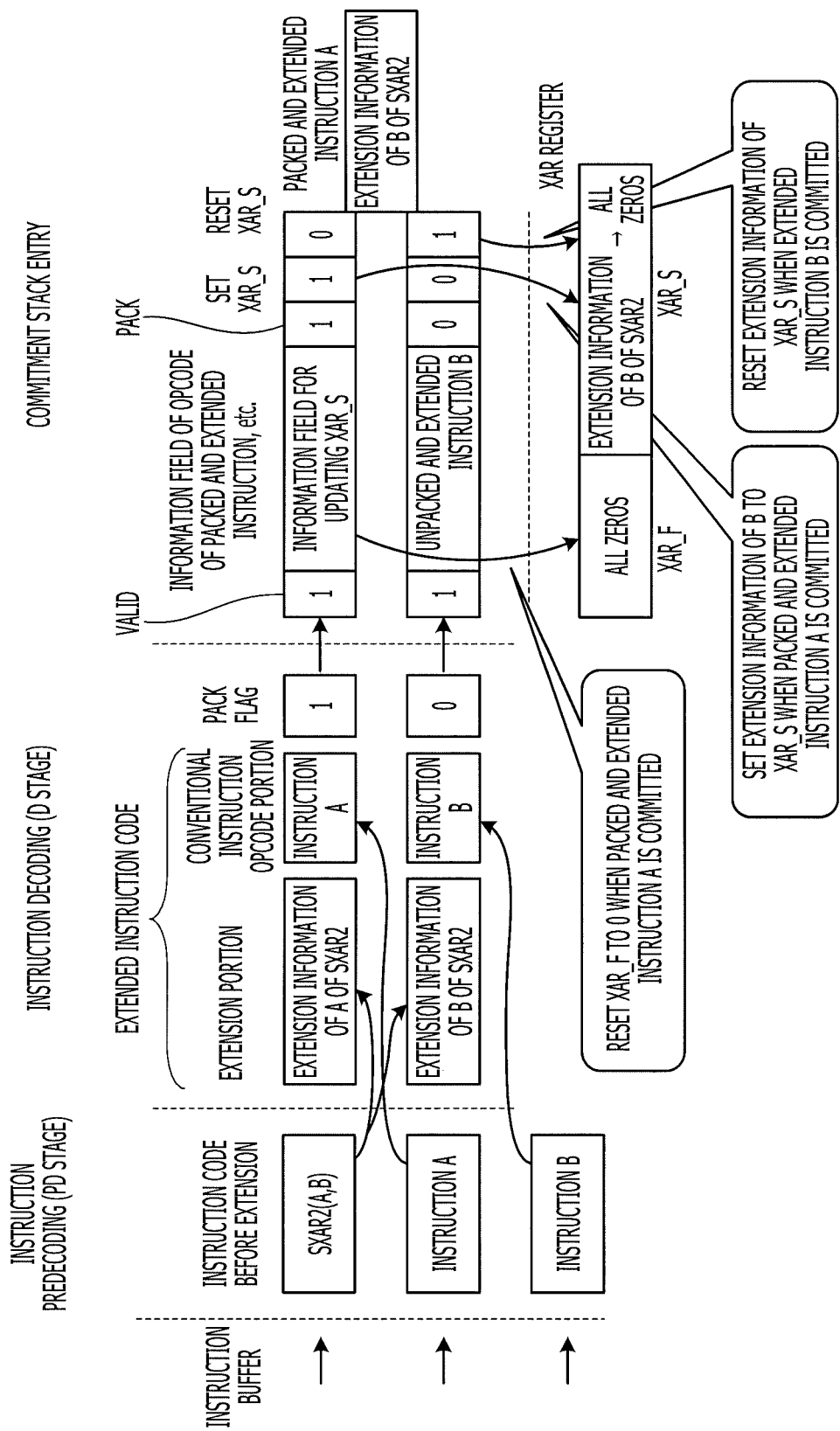
FIG. 21 illustrates extension of two instructions using an SXAR2 instruction and the flow of processing of an instruction that is packed with an immediately following instruction.

More specifically, as illustrated in FIG. 21, when the SXAR2 instruction and the immediately following instruction A are packed and processed as one instruction by the instruction predecoding part 31, the instruction decoding unit 32 decodes the packed and extended instruction A, and the execution processing unit 33 executes the instruction A. Furthermore, the execution processing unit 33 stores the extension information, for example, such as the opcode of the packed and extended instruction A in the commitment stack entry 34b. After the storing in the commitment stack entry 34b, when the instruction commitment determination unit 35 commits the packed and extended instruction A that is extended as a result of the SXAR2 instruction and the instruction A being packed, the instruction commitment determination unit 35 resets the extension information of the XAR_F of the XAR 26 to zero. Furthermore, the instruction commitment determination unit 35 that committed the packed and extended instruction A stores, in the XAR_S, "S_SIMD", "S_RS3", "S_RS2", "S_RS1", and "S_RD" of the 12th to 0th bits that are specified by the SXAR2 instruction that extends the subsequent instruction B.

Regarding the instruction B of the second instruction immediately following the SXAR2 instruction, the instruction decoding unit 32 decodes the unpacked and extended instruction B in which the instruction B of the second instruction immediately following the SXAR2 instruction is extended by using the extension information of the SXAR2 instruction stored in the XAR_S. Then, the execution processing unit 33 executes the unpacked and extended instruction B that is decoded. In this case, the instruction commitment determination unit 35 resets the extension information for the instruction B stored in the XAR_S of the XAR 26 to zero, when the instruction commitment determination unit 35 commits the unpacked and extended instruction B.

That is, when the SXAR2 instruction is packed with the immediately following instruction A and is committed as the packed and extended instruction A, the value of the XAR_F of the XAR 26 is reset to zero. Consequently, it is not necessary to store the extension information of the instruction A. However, even when a trap process or the like occurs before the subsequent unpacked and extended instruction B is executed, it is necessary to accurately execute the extended instruction B. For this reason, it is necessary to store the extension information of the instruction B of the SXAR2 instruction in an "XAR_S updating information" field, which is a field that is not reset even if the packed and extended instruction A is executed or committed. Then, the value of the XAR_S of the XAR 26 is reset to zero, when the unpacked and extended instruction B is committed after it is executed.

On the other hand, when the SXAR2 instruction and the immediately following instruction are not packed in the above-described unpack rerun mode or the like, similarly to a case in which the extension information corresponding to the XAR_F is not packed with the SXAR1 instruction, the information is stored by using a field that is used by an ordinary instruction as much as possible, and the XAR_F is updated.

Figure 22:
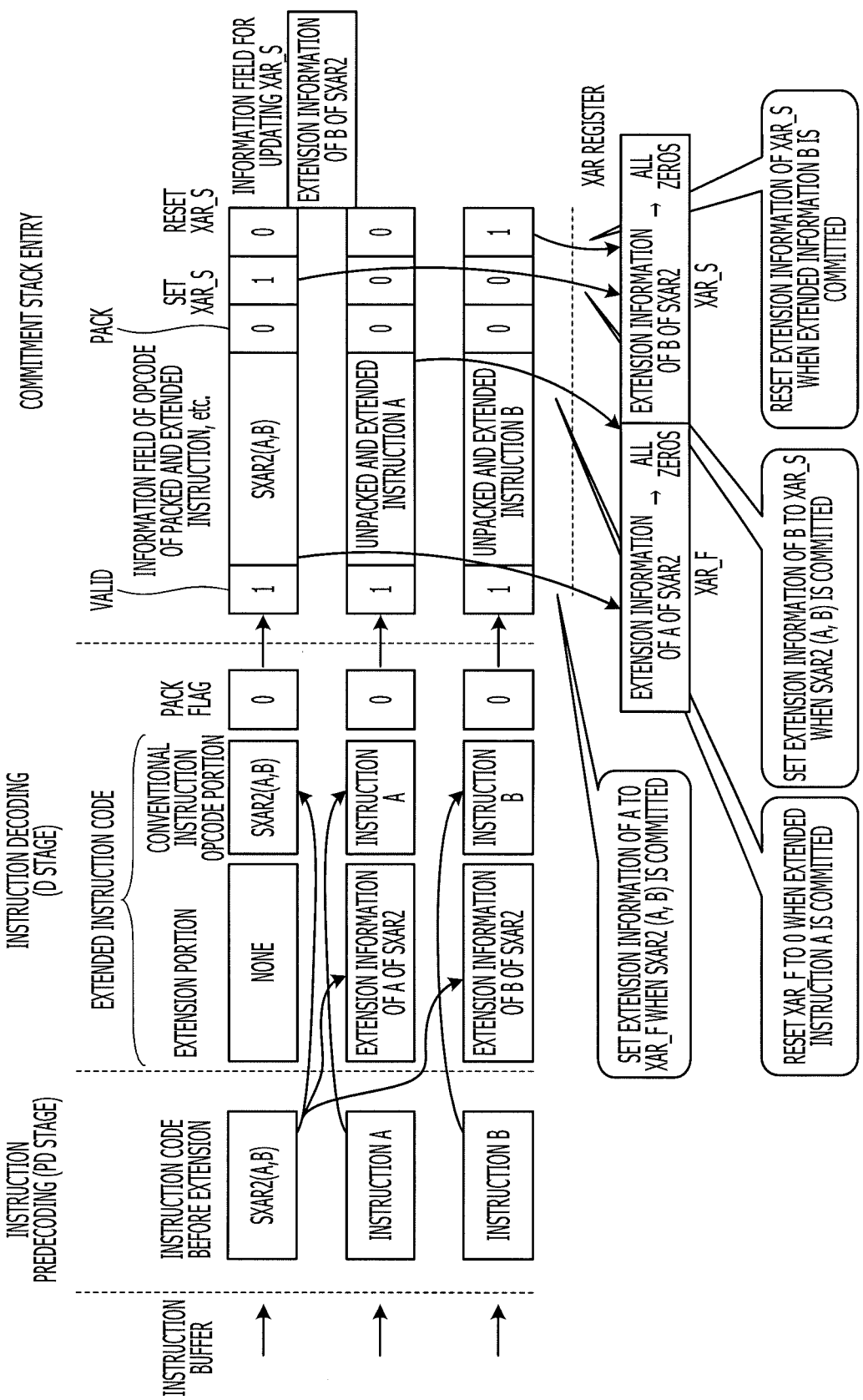
FIG. 22 illustrates the flow of processing of an instruction that is not packed with the SXAR1 instruction.

More specifically, as illustrated in FIG. 22, since the instruction predecoding unit 31 does not pack the SXAR2 instruction with the immediately following instruction and does not process the instructions, the instruction decoding unit 32 decodes the SXAR2 instruction singly in advance. Then, the information of the SXAR2 instruction is stored in the commitment stack entry 34b. Then, when the instruction commitment determination unit 35 commits the SXAR2 instruction, the instruction commitment determination unit 35 stores the information that extends the subsequent instructions A and B in the XAR_F and the XAR_S of the XAR 26, respectively. For example, the instruction commitment determination unit 35 sets "F_VAL" of the XAR_F of the XAR 26 to "1", and stores in the XAR_F part, "F_SIMD", "F_RS3", "F_RS2", "F_RS1", and "F_RD" of the 25th to 13th bit, which are specified by the SXAR2 instruction. Furthermore, the instruction commitment determination unit 35 stores in the XAR_S, "S_SIMD", "S_RS3", "S_RS2", "S_RS1", and "S_RD" of the 12th to 0th bits that are specified by the SXAR2 instruction.

After that, the instruction decoding unit 32 decodes the unpacked and extended instruction A in which the instruction A immediately following the SXAR2 instruction is extended by using the extension information in the SXAR2 instruction stored in the XAR_F. Then, the execution processing unit 33 executes the unpacked and extended instruction A that is decoded by the instruction decoding unit 32. Next, the instruction commitment determination unit 35 resets the extension information for the instruction A stored in the XAR_F of the XAR 26 to zero, when the instruction commitment determination unit 35 commits the unpacked and extended instruction A.

Furthermore, after the resetting of the extension information, the instruction decoding unit 32 decodes the unpacked and extended instruction B in which the instruction B of the second instruction immediately following the SXAR2 instruction is extended by using the extension information in the SXAR2 instruction stored in the XAR_S. Then, the execution processing unit 33 executes the unpacked and extended instruction B decoded by the instruction decoding unit 32. Next, the instruction commitment determination unit 35 resets the extension information for the instruction B stored in the XAR_S of the XAR 26 to zero, when the instruction commitment determination unit 35 commits the unpacked and extended instruction B.

When a study is made using examples of FIGS. 19 to 22 above, it is necessary to write, in the XAR_S of the XAR 26, the extension information of the second instruction regardless of whether or not the SXAR2 instruction is packed. However, increasing the number of fields of the commitment stack entries leads to an enlargement of circuit, and thus, this is desired to be avoided as much as possible. Furthermore, the extension of the SXAR instruction is not performed in the extension by the XAR 26. When such an instruction sequence appears, the hardware enters an exception trap. Furthermore, even when the SXAR2 instruction is packed with the immediately following instruction, these need not to be consecutively stored in the commitment stack entries. Therefore, it is sufficient that one storage unit for commitment stack entries that are necessary to update XAR_S information for the SXAR2 instruction is provided for two entries.

Figure 23:
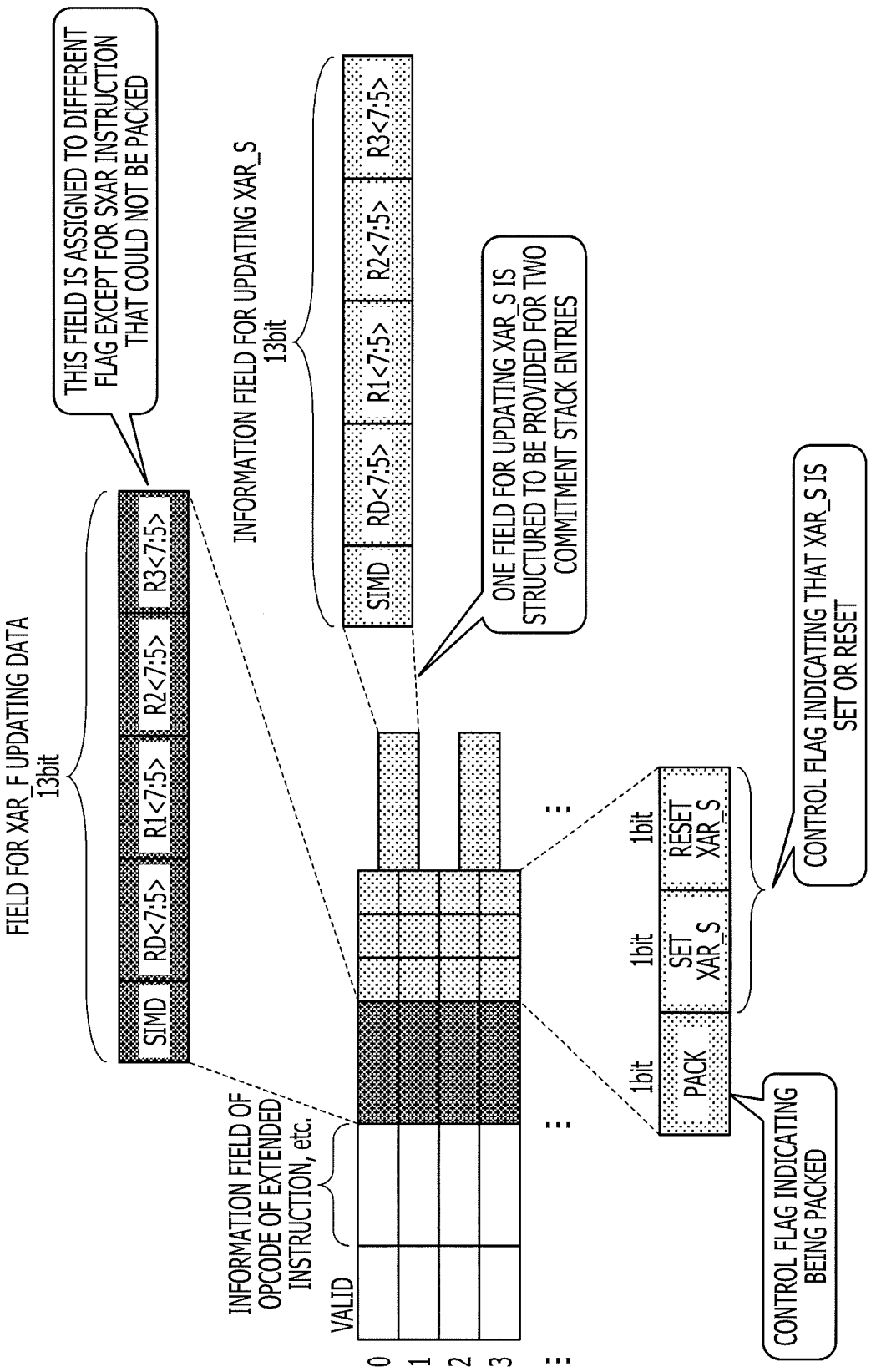
FIG. 23 illustrates the structure of a recommended commitment stat entry (buffer 34)

When the above is considered, it is preferable that the buffer 34 be configured as illustrated in FIG. 23. More specifically, a 1-bit field indicating whether or not XAR_S is to be set, and a 1-bit field indicating whether or not the XAR_S field is to be reset are provided for each of all the commitment stack entries. When a flag used to set the XAR_S field is flagged (for example, in the case of 1), in the case that the data of the XAR_S updating field corresponding to the commitment stack entry is instruction-committed, it is written into the XAR_S field. Furthermore, a flag used to reset the XAR_S field is flagged when an instruction extended in the XAR_S field is registered in the commitment stack entry. As a result of the above, when a flag is confirmed at a commitment stage and is flagged, the XAR_S field is reset.

Figure 24:
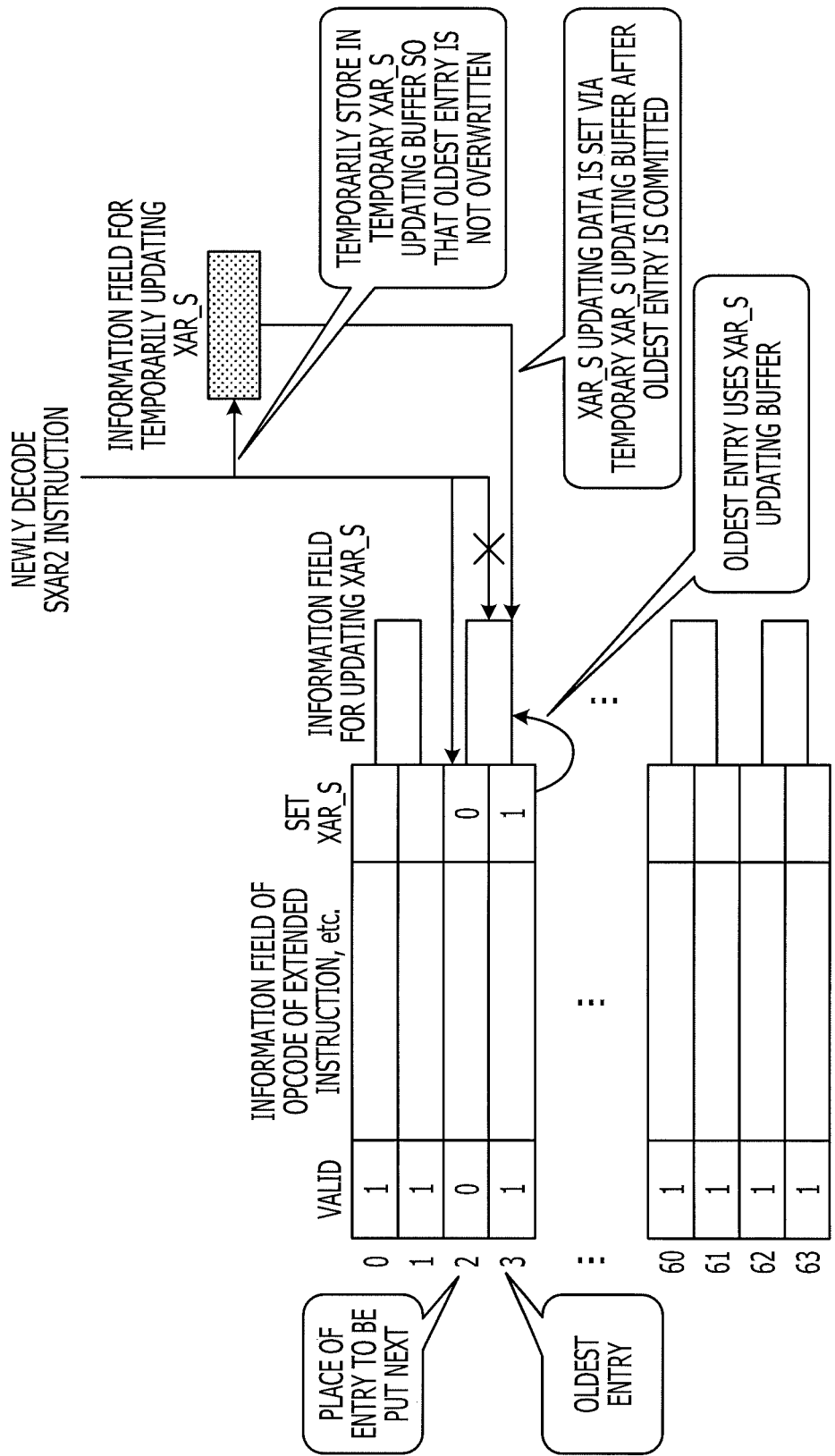
FIG. 24 illustrates a buffer for temporarily updating an XAR_S.

Furthermore, for example, a case in which commitment stack entries 34b or buffers 34 come into use except for one will be studied. In this case, as illustrated in FIG. 24, a field necessary for data for updating XAR_S of the SXAR2 instruction is shared by two entries. Therefore, if the SXAR2 instruction is decoded and a commitment stack entry is newly assigned, there is a possibility that the data for updating the XAR_S of the beginning instruction of the commitment stack entry is overwritten.

In order to solve this problem, it is possible to provide a buffer (buffer for temporarily updating XAR_S) for storing extension information for temporarily updating the XAR_S field (FIG. 25), when the SXAR2 instruction is decoded in a state in which the number of commitment stack entries that can be used is one. In this buffer for temporarily updating the XAR_S field, extension information for updating the XAR_S field is temporarily stored when the SXAR2 instruction is decoded. After that, when one or more instructions are committed, in response, data is moved to an XAR_S updating data field to which the instruction corresponds.

Use of commitment stat entries (buffers 34) of such a configuration makes it possible to efficiently use resources with which instructions and extension instructions are executed.

FIG. 19 illustrates the flow of the process of an instruction packed with an SXAR1 instruction. FIG. 20 illustrates the flow of the process of an instruction that is not packed with an SXAR1 instruction. FIG. 21 illustrates extension of two instructions by an SXAR2 instruction and the flow of the process of an instruction packed with the immediately following instruction. FIG. 22 illustrates the extension of two instructions of the SXAR2 instruction, and the flow of the process of an instruction that is not packed with an immediately following instruction. FIG. 23 illustrates the structure of a recommended commitment stat entry (buffer 34). FIG. 24 illustrates a buffer for temporarily updating the XAR_S part.

Embodiments of the disclosed arithmetic processing apparatuses have been described thus far. The disclosed arithmetic processing apparatuses may be embodied in various different forms in addition to the above-described embodiments. Accordingly, as described below, the different embodiments will be described.

Figure 25:
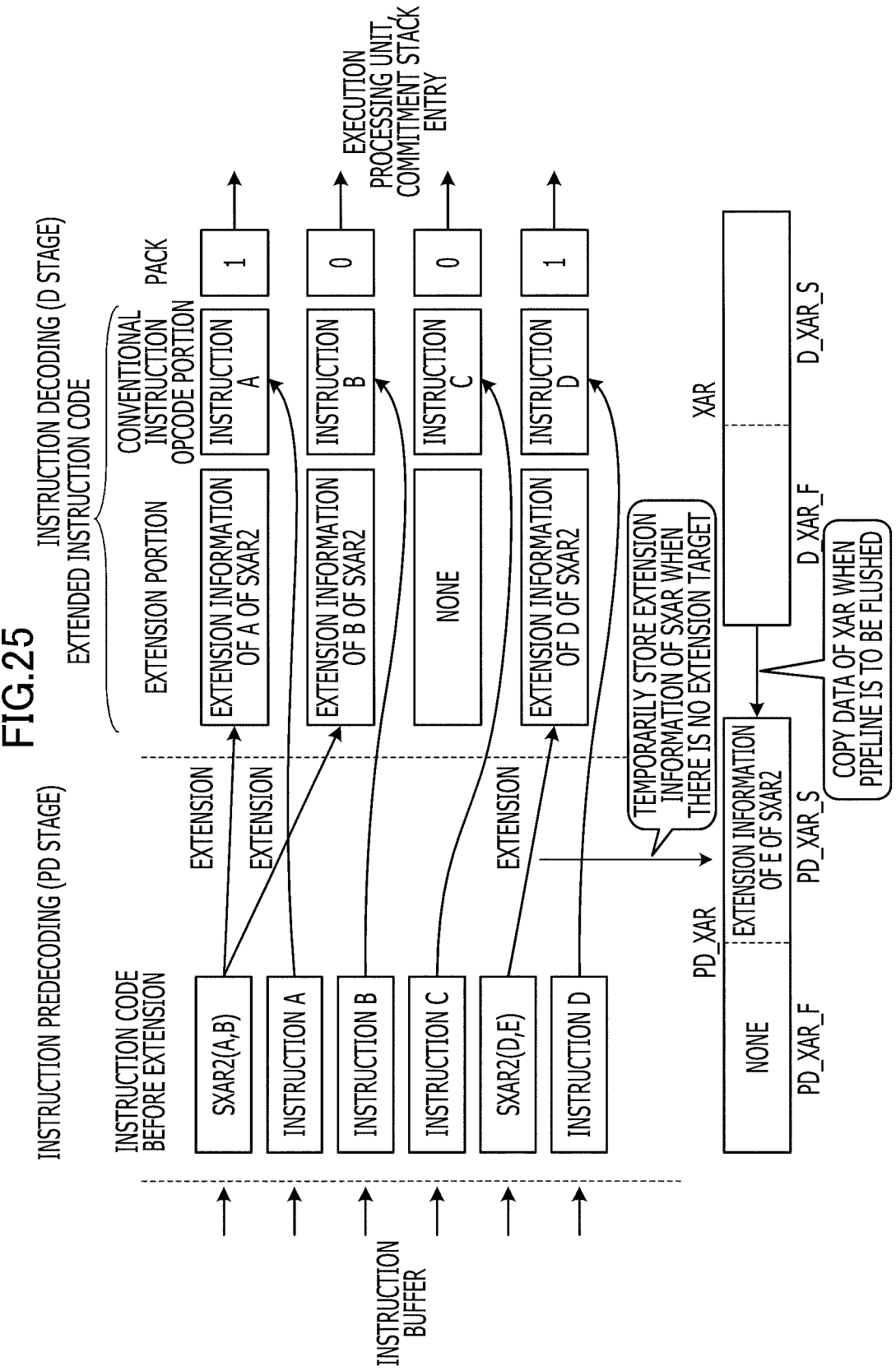
FIG. 25 illustrates an intermediate-state register.

For example, a case is considered in which an SXAR and an instruction extended thereby are not put simultaneously in the slot of the instruction predecoding unit 31, as illustrated in FIG. 25. FIG. 25 illustrates that an instruction E that follows SXAR2 (D, E) has not been put in the slot of the instruction predecoding unit 31 at the same timing as that of an instruction D. In this case, it is necessary to attach extension information to the instruction E that is predecoded at the next and subsequent cycle. For this reason, it is possible to provide an intermediate-state register "PD_XAR register" for storing the information of the SXAR until the instruction to be extended is decoded.

It is effective that this PD_XAR register is provided at a place near the instruction predecoding unit 31 and the instruction decoding unit 32. Furthermore, this is effective for a case in which pipeline flush is performed owing to a branch prediction mistake or owing to shifting to a trap process in addition to a case in which an SXAR and an instruction that is extended by the SXAR are not put simultaneously in the slot of the instruction predecoding unit 31. More specifically, it is recommended that the value of the XAR register that is a master is copied to the PD_XAR, and subsequent instruction extension information is attached. FIG. 25 illustrates an intermediate-state register.

FIG. 26 illustrates the relationship between an SXAR1 instruction and an SXAR2 instruction. In the above-described embodiments basically examples in which a prefix instruction SXAR2 is used have been described, alternatively, similar processing is possible by using an SXAR1 instruction. As illustrated in FIG. 26, since an SXAR1 instruction and an SXAR2 instruction are equivalent to each other in terms of software, in a compiler, codes are generated using the SXAR2 instruction. For example, the number of slots described with reference to FIG. 15 will be described. With respect to two consecutive instructions to be extended, rather than being an SXAR2 instruction and two extended instructions, an SXAR1 instruction and one extended instruction, or an SXAR1 instruction and one extended instruction, may be set. In this case, unlike in FIG. 15, by setting the number of effective instructions to be decoded to three, it is possible to suppress a useless area, and it is possible to perform processing.

The many features and advantages of the embodiments are apparent from the detailed specification and, thus, it is intended by the appended claims to cover all such features and advantages of the embodiments that fall within the true spirit and scope thereof. Further, since numerous modifications and changes will readily occur to those skilled in the art, it is not desired to limit the inventive embodiments to the exact construction and operation illustrated and described, and accordingly all suitable modifications and equivalents may be resorted to, falling within the scope thereof.

What is claimed is:

1. A processor, comprising:
   a storage unit that stores an instruction;
   a program counter that holds a program counter value specifying an instruction to be executed next;
   an instruction extension information register that includes a first area and a second area;
   an instruction decoding unit that decodes a first prefix instruction including a first extension information extending an instruction immediately following the first prefix instruction and writes the first extension information to the first area when the first prefix instruction is executed, and that decodes a second prefix instruction including a first extension information extending an instruction that is the first sequential instruction immediately following the second prefix instruction and a second extension information extending an instruction that is the second sequential instruction immediately following the second prefix instruction and writes the first and second extension information of the second prefix instruction to the first and the second area, respectively, when the second prefix instruction is executed;
   an instruction packing unit that reads out instructions from the storage unit based on the program counter value, and that generates a packed instruction including information from at least one of the first prefix instruction and the second prefix instruction and the instruction immediately following the first prefix instruction or the second prefix instruction when the instruction decoding unit decodes at least one of the first prefix instruction and the second prefix instruction;
   an instruction execution unit that executes the packed instruction;
   a register updating unit that increases the program counter value by a number corresponding to a length of two instructions when the instruction execution unit completes the execution of the packed instruction; and
   an instruction predecoding unit that outputs up to an instruction plus a predetermined number of instructions to the decoding unit when one first prefix instruction is among a plurality of instructions read out from the storage unit, and that outputs up to two instructions plus a predetermined number of instructions to the decoding unit when two or more first prefix instructions or one or more second prefix instructions are among the plurality of instructions read out from the storage unit.

2. The processor according to claim 1,
   wherein the instruction decoding unit decodes a plurality of instructions simultaneously,
   wherein the instruction packing unit reads out from the storage unit a number of instructions equal to half of three times the number of instructions that can be decoded simultaneously by the instruction decoding unit when the number of instructions that can be decoded simultaneously is an even number, and
   wherein the instruction packing unit reads out from the storage unit a number of instructions equal to half of three times the number of instructions that can be decoded simultaneously plus 0.5 when the number of instructions that can be decoded simultaneously is an odd number.

3. The processor according to claim 1, further comprising:
   an instruction execution determination unit that initializes the instruction execution unit without completing the execution of the first prefix instruction or the second prefix instruction when an exception occurs due to the first prefix instruction, the second prefix instruction or an instruction immediately following the first prefix instruction or the second prefix instruction,
   wherein the instruction packing unit individually outputs the first prefix instruction or the second prefix instruction, and the immediately following instruction to the instruction execution unit without packing the first prefix instruction or the second prefix instruction with the immediately following instruction when the instruction execution determination unit has initialized the instruction execution unit, wherein the instruction execution unit individually executes the first prefix instruction or the second prefix instruction and the immediately following instruction outputted by the instruction packing unit, and wherein the register updating unit increases the program counter value by a number corresponding to the number of instructions executed by the instruction execution unit.

4. The processor according to claim 1,
wherein the register updating unit initializes the first extension information held in the first area of the instruction extension information register, when the instruction execution unit executes a packed instruction.

5. The processor according to claim 1,
wherein the register updating unit initializes the first extension information held in the first area after the execution of the instruction immediately following the first prefix instruction or the second prefix instruction is completed, when the instruction execution unit executes the first prefix instruction or the second prefix instruction and thereafter executes the instruction immediately following the first prefix instruction or the second prefix instruction.

6. The processor according to claim 1,
wherein the register updating unit initializes the second extension information held in the second area after the execution of an instruction that is the second sequential instruction immediately following the second prefix instruction is completed, when the instruction execution unit executes the second prefix instruction, and thereafter executes the instruction immediately following the second prefix instruction and the instruction that is the second sequential instruction immediately following the second prefix instruction.

7. The processor according to claim 1, further comprising:
a commitment information holding unit that holds information including at least an opcode of the packed instruction executed by the instruction execution unit until the instruction execution unit completes the execution of the packed instruction.

8. A method of controlling a processor including a storage unit storing instructions, a program counter holding a program counter value specifying an instruction to be executed next, and an instruction extension information register including a first area and a second area, the method comprising:

decoding at least one of a first prefix instruction including a first extension information extending an instruction immediately following the first prefix instruction and writing the first extension information to the first area when the first prefix instruction is executed, or a second prefix instruction including a first extension information extending an instruction that is the first sequential instruction immediately following the second prefix instruction and a second extension information extending an instruction that is the second sequential instruction immediately following the second prefix instruction and writing the first and second extension information of the second prefix instruction to the first and the second area respectively by an instruction decoding unit of the processor when the second prefix instruction is executed;

reading out instructions from the storage unit based on the program counter value;

generating a packed instruction including information from at least one of the first prefix instruction and the second prefix instruction, and the instruction immediately following the first prefix instruction or the second prefix instruction when the instruction decoding unit decodes at least one of the first prefix instruction and the second prefix instruction;

executing the packed instruction by using an instruction execution unit of the processor;

updating the program counter value by a number corresponding to a length of two instructions when the instruction execution unit completes the execution of the packed instruction; and outputting up to an instruction plus a predetermined number of instructions to the decoding unit when one first prefix instruction is among a plurality of instructions read out from the storage unit, or outputting up to two instructions plus a predetermined number of instructions to the decoding unit when two or more first prefix instructions or one or more second prefix instructions are among the plurality of instructions read out from the storage unit.

9. The method according to claim 8, further comprising:
decoding simultaneously a plurality of instructions by the instruction decoding unit; and
reading out from the storage unit a number of instructions equal to half of three times the number of instructions that can be decoded simultaneously by the instruction decoding unit when the number of instructions that can be decoded simultaneously is an even number, or reading out from the storage unit a number of instructions equal to half of three times the number of instructions that can be decoded simultaneously plus 0.5 when the number of instructions that can be decoded simultaneously is an odd number.

10. The method according to claim 8, further comprising:
initializing the instruction execution unit without completing the execution of the first prefix instruction or the second prefix instruction when an exception occurs due to the first prefix instruction, the second prefix instruction or an instruction immediately following the first prefix instruction or the second prefix instruction;

outputting individually the first prefix instruction or the second prefix instruction, and the immediately following instruction to the instruction execution unit without packing the first prefix instruction or the second prefix instruction with the immediately following instruction when the instruction execution determination unit has initialized the instruction execution unit;

executing individually the first prefix instruction or the second prefix instruction, and the immediately following instruction; and increasing the program counter value by a number corresponding to the number of instructions executed by the instruction execution unit.

11. The method according to claim 8, further comprising:
initializing the first extension information held in the first area of the instruction extension information register, when the instruction execution unit has executed the packed instruction.

12. The method according to claim 8, further comprising:
initializing the first extension information held in the first area after the execution of the instruction immediately following the first prefix instruction or the second prefix instruction is completed, when the instruction execution unit executes the first prefix instruction or the second prefix instruction and thereafter executes the instruction immediately following the first prefix instruction or the second prefix instruction.

13. The method according to claim 8, further comprising:
initializing the second extension information held in the second area after the execution of an instruction that is the second sequential instruction immediately following the second prefix instruction is completed, when the instruction execution unit executes the second prefix instruction, and thereafter executes the instruction immediately following the second prefix instruction and the instruction that is the second sequential instruction immediately following the second prefix instruction.

14. The method according to claim 8, further comprising:
holding information including at least an opcode of the instruction executed by the instruction execution unit until the instruction execution unit completes the execution of the instruction.

* * * * *